US008063881B2

(12) United States Patent  
Wright

(10) Patent No.: US 8,063,881 B2
(45) Date of Patent: Nov. 22, 2011

(54) METHOD AND APPARATUS FOR SENSING MOTION OF A USER INTERFACE MECHANISM USING OPTICAL NAVIGATION TECHNOLOGY

(75) Inventor: David Gordon Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1335 days.

(21) Appl. No.: 11/294,913

(22) Filed: Dec. 5, 2005

(65) Prior Publication Data

US 2007/0126700 A1 Jun. 7, 2007

(51) Int. Cl.
*G06F 3/033* (2006.01)
(52) U.S. Cl. ........................................ 345/157; 345/161
(58) Field of Classification Search .......... 345/156–167, 345/179, 184; 178/18.01–18.03, 18.09, 18.11, 178/19.01, 19.05; 74/471 XY
See application file for complete search history.

(56) References Cited

U.S. PATENT DOCUMENTS

| | | | | | |
|---|---|---|---|---|---|
| 4,643,074 A | * | 2/1987 | Gunda et al. | ..................... | 91/361 |
| 5,355,148 A | * | 10/1994 | Anderson | ..................... | 345/166 |
| 5,541,622 A | * | 7/1996 | Engle et al. | ..................... | 345/161 |
| 5,724,068 A | * | 3/1998 | Sanchez et al. | ..................... | 345/161 |
| 5,907,152 A | | 5/1999 | Dändliker et al. | | |
| 5,994,710 A | | 11/1999 | Knee et al. | | |
| 6,172,665 B1 | * | 1/2001 | Bullister | ..................... | 345/163 |
| 6,300,940 B1 | * | 10/2001 | Ebina et al. | ..................... | 345/161 |
| 6,373,047 B1 | * | 4/2002 | Adan et al. | ..................... | 250/221 |
| 6,529,184 B1 | * | 3/2003 | Julienne | ..................... | 345/157 |
| 2005/0248535 A1 | * | 11/2005 | Sawyer | ..................... | 345/167 |
| 2006/0022116 A1 | * | 2/2006 | Wang | ..................... | 250/208.1 |

OTHER PUBLICATIONS

"Logitech Marble™ Optical Technology White Paper", Logitech, Inc., Marble White Paper, Jan. 23, 2002, 6 pages.
"Optical Marble Technology", Logitech, 2005, 2 pages, downloaded Nov. 29, 2005, http://www.logitech.com/index.cfm/products/technology/documents/US/EN,CRID=907,parentCRID=815.
"Cyborg Evo", Saitek, 2005, 2 pages, downloaded Oct. 10, 2005, http://www.saitekusa.com/usa/prod/cyborg_evo.htm.
"Logitech® Extreme™ 3D Pro", Logitech, 4 pages, downloaded Oct. 10, 2005, http://www.logitech.com/index.cfm/products/details/NO/EN,CRID=2221,CONTENTID=....
"Microsoft Sidewinder Precision Pro Joystick", Amazon.com, 7 pages, downloaded Oct. 18, 2005, http://www.amazon.com/gp/product/B00000JDFT/104-4029117-3811163?v=glance&n=172282&v=gla....
"Precision Sales", Google Images, 1 page, downloaded Oct. 10, 2005, Google Image Result for http://www.precisionsales.com/PageMill_Images/image9.gif.
"ADNS-2051 • High-performance Optical Mouse Sensor", Agilent Technologies, 2 pages, downloaded Oct. 10, 2005, http://www.home.agilent.com/USeng/nav/-536893734.536883737/pd.html.
"Agilent ADNS-2051 Optical Mouse Sensor", Agilent Technologies, Inc., Product Overview, 2003, 2 pages.
"Agilent ADNS-2051 Optical Mouse Sensor", Agilent Technologies, Inc., Data Sheet, 2004, 40 pages.

(Continued)

*Primary Examiner* — Amr Awad
*Assistant Examiner* — Kenneth Bukowski

(57) ABSTRACT

A method and an apparatus for determining displacement of a surface member coupled to a user interface mechanism, for example a joystick handle, using a fixed optical motion sensor. Using the displacement of the surface member, the method, and apparatus may determine an absolute position of the surface member, recalibrating a center point upon detecting a difference in light reflection of the center point.

18 Claims, 13 Drawing Sheets

OTHER PUBLICATIONS

"ADNS-2030 • High Performance, Low Power Optical Mouse Sensor (Optimized for Cordless Mouse Applications)", Agilent Technologies, 2 pages, downloaded Oct. 10, 2005, http://www.home.agilent.com/USeng/nav/-536893734.536883736/pd.html.

"Agilent ADNS-2030 Optical Mouse Sensor", Agilent Technologies, Inc., Product Overview, 2002, 4 pages.

"Agilent ADNS-2030 Low Power Optical Mouse Sensor", Agilent Technologies, Inc., Data Sheet, 2005, 34 pages.

"Optical Mice and how they Work: The Optical Mouse is a complete imaging system in a tiny package.", Agilent Technologies, Inc., White Paper, Agilent Technologies Semiconductor Products Group, 2004, 4 pages.

Mei, Teo Chiang, "Understanding Optical Mice", Agilent Technologies, Inc., White Paper, 2005, 8 pages.

"Agilent ADNK-2030 Solid-State Optical Mouse Sensor", Agilent Technologies, Inc., Sample Kit, 2003, 1 page.

"Agilent Optical Mouse Sensors", Agilent Technologies, Inc., Selection Guide, 2004, 2 pages.

* cited by examiner

METHOD AND APPARATUS FOR SENSING MOTION OF A USER INTERFACE MECHANISM USING OPTICAL NAVIGATION TECHNOLOGY

TECHNICAL FIELD

The present invention relates generally to the field of motion sensors and, more specifically, to optical motion sensors.

BACKGROUND

User interface mechanisms, such as joysticks, computer mice, and trackballs, are well known for inputting data into and interfacing with personal computers. Similarly, joysticks are well known for inputting data into and interfacing with computers (e.g. game consoles) for various gaming applications, for example, flight simulation, robotic control, video games, arcades, etc. In addition to the consumer applications, joysticks and other user interface mechanisms are used in industrial applications, for example, for controlling robotics, computers, and machinery, such as tail lifts, backhoes, and other known machinery. Such industrial applications may require high reliability and accuracy.

Pointing devices allow rapid relocation of a cursor on a monitor, and are useful in many text, database, and graphical programs. A user controls the cursor, for example, by moving the mouse over a surface to move the cursor in a direction and over distance proportional to the movement of the mouse. Pointing devices, generally, detect only incremental motion or change in positions; however, pointing devices do not detect absolute position of the cursor. Typically, mice technology has a loose count of the incremental motions of the pointing device or, in other words, mice technology tolerates error. The error is implicitly corrected using a negative feedback operation via the user. If the user observes the error in the position of the cursor, the user corrects the error by moving the pointing device accordingly to reposition the cursor. Conversely, joysticks and other user interface mechanisms generally detect the absolute position of the device. Absolute position may be determined by accumulating the incremental motions; however, drift in the absolution may be introduced by the positional error.

Traditionally, joysticks have used a pair of potentiometers coupled to a moving member, for example, the joystick handle, by an apparatus, which separates the x- and y-axis movement of the joystick handle into separate rotational movement in such a way that the x-component of handle motion transfers to one potentiometer and the y-component transfers to the other potentiometer.

More recently, some conventional joysticks used in personal computer (PC) gaming have included a "twist" axis, in which twisting the joystick handle caused a third potentiometer to be rotated. For example, twist axes may be used in flight simulation PC gaming, in which the twist action controls a function, such as, the rudder control. Twist axes may also be used in robotic controls for twisting an appendage of a robot or for spinning the robot. Twist axes may also be used in high-end joysticks used in other consumer and industrial applications.

Use of potentiometers to sense joystick handle motion has a number of disadvantages, most significantly, the reliability of potentiometers. An inexpensive potentiometer may have a life of only a few hundred thousand cycles, which is equivalent to only a few months of regular use. Higher quality devices may have a life of a few million cycles, but that still results in a reliable life of little more than a year if the joystick is regularly used; however, these devices typically cost significantly more—often up to approximately $0.50. Thus, the cost of making a joystick with 1-2 year life may include $1.50 or more just for the potentiometers.

Conventional potentiometer-based joysticks also have disadvantages with respect to accuracy, centering, precision linearity of potentiometers output (typically +/−20%), scaling, and mechanical complexity. With respect to accuracy and centering, drift may exist in the absolute position of the joystick when the accumulated counts or displacements have error, indicating that the joystick is slightly off-centered, when in fact the joystick is centered. Drift affects the precision of the conventional potentiometer-based joysticks as well. With respect to linearity, conventional potentiometer-based joysticks may have non-uniformity in the output signals because of the printed resistive track. The potentiometer has a non-uniform resistivity on the surface of the track, which results in differing output values for equal distance movements of the wiper over different areas of the track. With respect to noise, the wiper of the potentiometers at times, especially after being worn down over time, may lose contact with the resistive surface. By losing contact with the surface, the wiper introduces additional noise into the system. Furthermore, the potentiometers introduce additional electrical noise due to the electrical nature of potentiometers.

For these reason, there have been many attempts to develop non-contacting joystick reading technologies. Many conventional optical, electromagnetic, and capacitive solutions to this problem have been brought to market, but the conventional optical solution is the only one sufficiently cost-effective to have been successfully applied to the mass market. However, this conventional optical solution is no less expensive than a high quality potentiometer solution. This solution utilizes variations in the intensity of an optical light source, such as a light emitting diode (LED), as the angle between the LED and a photodiode array changes to detect the motion of a joystick handle. This analog optical technology has many of the same accuracy, precision, centering and scaling problems of conventional potentiometer-based joysticks. Furthermore, the conventional analog optical joysticks have disadvantages with respect to their mechanical complexity.

Conventional trackball mouse designs area derivative of mice designs. Conventional trackballs may be used to also allow rapid relocation of the cursor on the monitor, but do so by rotating the trackball with a user's thumb, finger, or palm of the hand. Conventional trackballs detect only incremental motion or change in positions, and do not detect absolute positions of the cursor. Conventional trackballs also have a loose count of the incremental motions, and similarly, tolerates such error due to the negative feedback of the user.

BRIEF DESCRIPTION OF THE DRAWINGS

Present embodiments are is illustrated by way of example and not limitation in the figures of the accompanying drawings, in which like references indicate similar elements and in which.

DETAILED DESCRIPTION

Figure 1:
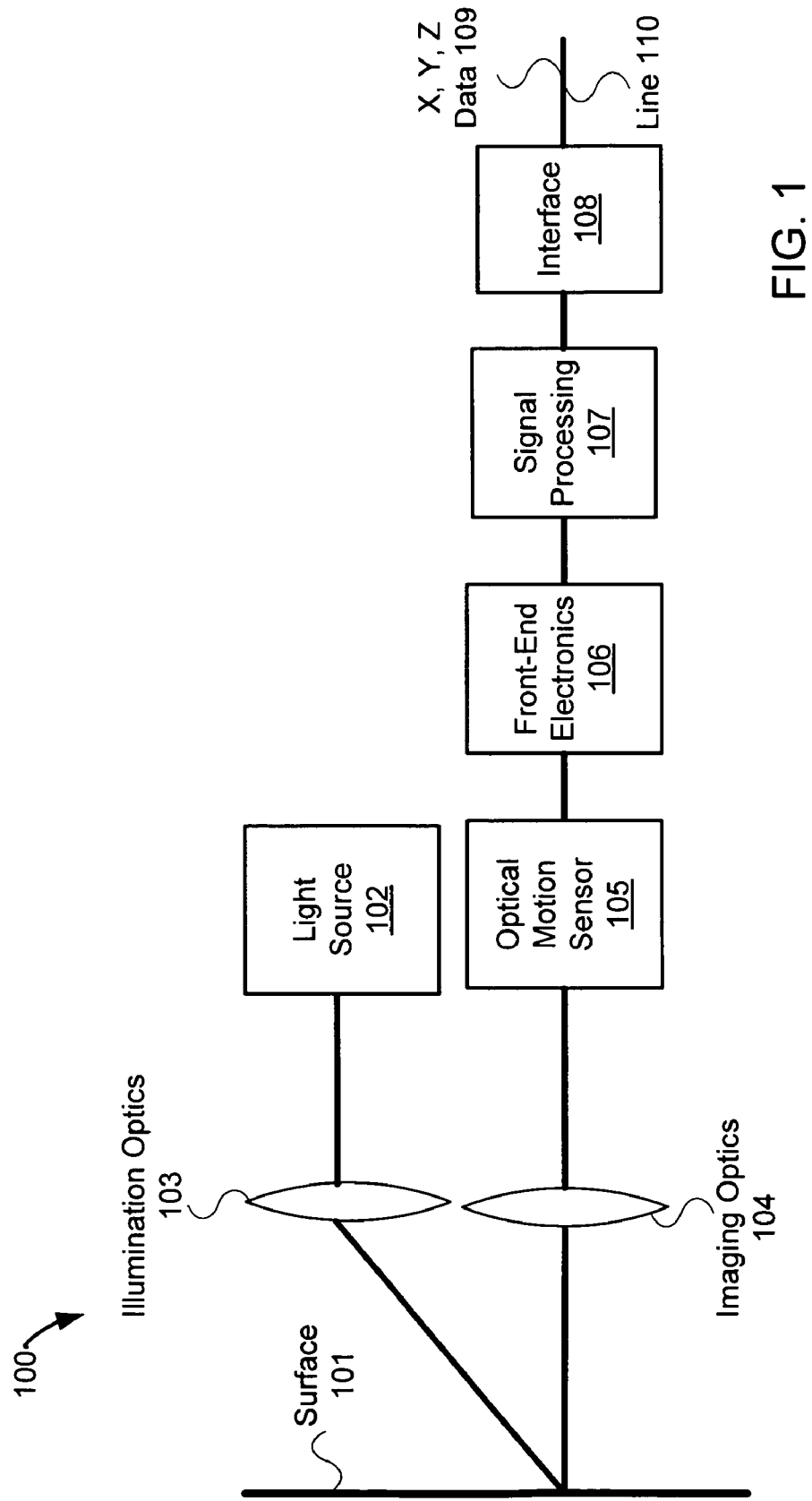
FIG. 1 illustrates a functional block diagram of one embodiment of an apparatus for determining displacement and absolute position of a surface member coupled to a user interface mechanism.

Described herein is an apparatus and method for determining displacement of a surface member coupled to a user interface mechanism, for example a joystick handle, using a fixed optical motion sensor, also known as optical navigation sensor. Using the displacement of the surface member, the method and apparatus may determine an absolute position of the surface member, recalibrating a center point upon detecting a difference in light reflection of the center point. In order to reduce drift in the positional error, the apparatus and method described herein, periodically detects a center point or reference point in order to recalibrate the absolute position of the user interface mechanism, for example, a joystick handle or a trackball mouse assembly. It should be noted that the embodiments described herein, may apply a variant of a near ubiquitous technology used in optical mice to implement in sensing motion of a joystick or other user interface mechanisms.

Various optical mouse-sensing technologies may be used to provide an accurate measure of x-, y-, and z-axis motion of a surface member relative to the optical motion sensor. Therefore, by coupling the joystick handle to a surface member, and positioning an optical motion sensor in a fixed position, such that the surface member moves over the optical motion sensor as the joystick handle moves, the optical motion sensor and associated DSP may detect motion of the joystick handle. Using the motion detected by the optical motion sensor, an absolute position of the joystick handle may be determined. Drift in the absolute position may be reduced by recalibrating a center point upon detecting a difference in light reflection at a reference point or center position.

In one embodiment, a joystick handle may be coupled to a surface member, having an optically rough surface. The surface member may be curved or alternatively, flat. The surface member may be positioned over a fixed optical motion sensor, such that the surface member moves over the optical motion sensor as the joystick handle moves. The optical motion sensor and associated DSP may detect the incremental motions of the joystick handle and provide an accurate measure of x-, y- and z-axis incremental motions of the surface member relative to the optical motion sensor. The optical motion sensor and associated DSP may also determine the absolute position of the surface member and associated joystick handle using the incremental motions of the surface member. To determine the absolute position, the optical motion sensor and associated DSP may detect a fixed reference point as a center point. By periodically detecting this fixed reference point, "drift" in the output of the joystick may be reduced, increasing the tracking accuracy and tracking precision of the surface member of the joystick handle using the optical motion sensor.

In another embodiment, the user interface mechanism may be a trackball mouse assembly. The trackball has an optically rough, curved surface that may be positioned over a fixed optical motion sensor, such that the surface of the trackball moves over the optical motion sensor as the trackball is moved. The optical motion sensor and associated DSP may detect the incremental motion of the trackball and provide an accurate measure of x-, y- and z-axis incremental motions of the surface of the trackball relative to the optical motion sensor. The optical motion sensor and associated DSP may also determine the absolute position of the surface of the trackball using the incremental motions of the surface member. To reduce drift in the absolute position, the optical motion sensor and associated DSP may detect a fixed reference point on the trackball as a center point. By periodically detecting this fixed reference point, "drift" in the output of the trackball may be reduced, increasing the tracking accuracy and tracking precision of the trackball using the optical motion sensor.

Optical mice have become very popular, because they provide better pointing accuracy. The dominant technology used today for optical mice relies on a light emitting diode or LED illuminating a surface at or near grazing incidence, and a two-dimensional CMOS detector which captures the resultant images, and software that correlates successive images to determine the direction, distance and speed the mouse has been moved. This technology provides high accuracy but suffers from a complex design and relatively high image processing requirements. In addition, the optical efficiency is low due to the grazing incidence of the illumination.

Another approach uses one-dimensional arrays of photosensors or detectors, such as photodiodes. Successive images of the surface are captured by imaging optics, translated onto the photodiodes, and compared to detect movement of the mouse. The photodiodes may be directly wired in groups to facilitate motion detection. This reduces the photodiode requirements, and enables rapid analog processing. Alternatively, a coherent light source, such as a laser may be used. The light from the coherent light source is scattered off an optically rough surface, generating a random intensity distribution of light known as speckle, as described below. The use of a speckle-based pattern has several advantages, including efficient laser-based light generation and high contrast images even under illumination at normal incidence. This allows for a more efficient system and conserves current consumption, which is very important in wireless applications.

FIG. 1 illustrates a functional block diagram of one embodiment of an apparatus for determining displacement and absolute position of a surface member coupled to a user interface mechanism. Apparatus 100 includes surface 101, light source 102, illumination optics 103, imaging optics 104, optical motion sensor 105, front-end electronics 106 coupled to the optical motion sensor 105, signal processing block 107 coupled to the front-end electronics 106, and interface 108 coupled to the signal processing block 107. In one embodiment, a surface member, including surface 101, is coupled to a user interface mechanism. Surface 101 may be a flat surface, as illustrated in and described with respect to FIG. 6. Alternatively, surface 101 may be a curved surface, as illustrated in and described with respect to FIGS. 4 and 5.

Light source 102 transmits light onto the surface 101 of the surface member. In one embodiment, illumination optics 103 may be used to focus the transmitted light onto a specific region of surface 101. Alternatively, the light source 102 may transmit light directly onto the surface 101. Because surface 101 is optically rough, the transmitted light is scattered off the surface 101 of the surface member to form a speckle variation. Optical motion sensor 105 receives the speckle variation from the surface 101 of the surface member. In one embodiment, imaging optics 104 may be used to focus the scattered light from surface 101 onto the optical motion sensor 105. Imaging optics 104 may be telecentric for optimum performance. Alternatively, the surface may reflect the speckle variation directly onto the optical motion sensor 105.

In one embodiment, the optical motion sensor 105 may be a CMOS image sensor. CMOS image sensors are rapidly declining in cost. While a one-megapixel sensor was an expensive integrated circuit (IC) only a few years ago, even five megapixel sensors are becoming inexpensive. Such sensors are usually color, having three sensing elements per pixel, each tuned to receive light of different wavelengths. Today, a one megapixel (1024×1024) monochrome sensor may be made quite inexpensively, in comparison to the color image sensors, and in comparison to the cost of 2 or 3 potentiometers.

In another embodiment, the optical motion sensor 105 may be an optical mouse sensor. The optical mouse sensor may be used to determine displacement of the surface member. The optical mouse sensor may include a very small digital camera sensor, which continuously takes "pictures" of a moveable surface, while the movable surface is illuminated by an LED or laser, which may be positioned close to the optical mouse sensor. This optical mouse sensor is then coupled to a DSP, which performs a 2-D correlation on successive images in order to determine the magnitude of incremental movements in the x- and y-directions, accumulating the incremental movements to determine the absolute position of the movable surface member.

In conventional mouse applications, the correlation algorithms performed by the DSP deliberately ignore any rotational changes between successive images, because such information is not used in a traditional mouse user interface. However, in another embodiment, alternative correlation algorithms may be implemented in the DSP or other processing element to sense rotational, "z-axis," or "twist-axis" motion in addition to the traditional x- and y-axis sensing of an optical mouse sensor. In order to center the z-axis for the rotational joystick motions, optical mouse sensor generally permit firmware to read out the "raw" sensor array data, which includes z-axis rotations in addition to the x- and y-direction translations. In one exemplary embodiment, the optical mouse sensor may be a 22×22 pixel array. The firmware of the optical mouse sensor reads a 484-bit register from the optical mouse sensor, for example, through a serial interface. The pixels that have detected a dark-colored spot in the speckle variation may be represented as a one in the register and pixels that have detected a light-colored spot in the speckle variation may be represented as a zero in the register, or vice versa. In this embodiment, by providing a dark-colored cross as the dark-colored reference point or center marker to detect x-y centering, then the dark-colored area of the cross may be detected, indicating the x-y center position. Firmware of the optical mouse sensor may read the pixel data and process the image of the "cross" to determine whether the image of the cross is rotated or not. If the image of the cross is not rotated, then the z-axis count, containing the net movement in the z-axis, is reset to zero.

It should be noted that although described as being performed by the firmware of the optical mouse sensor, the processing (e.g., correlation) of the image of a cross to determine z-axis rotations may be performed using algorithms in the signal processing block 107 or DSP 207 or in other processing elements known by those of ordinary skill in the art. Alternatively, an improved optical mouse sensor, designed to be used in joystick as well as mouse applications, may be configured to perform this processing itself, instead of using firmware or other external processing elements, such as signal processing 107 and DSP 207 or other processing elements known by those of ordinary skill in the art.

In one exemplary embodiment, optical mouse sensor may be a CMOS based sensor, ADNS-2051, High-performance Optical Mouse Sensor, manufactured by Agilent Technologies, Inc. of Palo Alto, Calif., U.S.A. Alternatively, optical mouse sensor may be a CMOS based sensor, ADNS-2030, High-performance, Low Power Optical Mouse Sensor (Optimized for Cordless Mouse Applications, manufactured by Agilent Technologies, Inc. of Palo Alto, Calif., U.S.A. ADNS-2051 and ADNS-2030 are optical sensors used to implement a non-mechanical tracking engine for implementing a computer-pointing device or computer mice. The optical sensors are based on optical navigation technology, which measures changes in position by optically acquiring sequential surface images (frames) up to 2300 times per second and mathematically determining the direction and magnitude of movement at a range of 400-800 counts per inch (cpi) and at speeds up to 14 inches per second (ips). Alternatively, other optical mouse sensors known by those of ordinary skill in the art may be used.

Optical motion sensor 105 detects the speckle variation, transmitting data to the front-end electronics 106. The front-end electronics 106 are used to condition or pre-process the analog signals received from optical motion sensor 105 to be processed by signal processing block 107. In one embodiment, front-end electronics 106 may include one or more amplifiers, such as trans-impedance amplifiers. Alternatively, the front-end electronics 106 may include a muxing-scheme. Front-end electronics 106 may further include one or more analog-to-digital converter (ADC) to convert one or more analog signals generated by the optical mouse sensor 105 to one or more digital signals to be processed by a digital signal processing (DSP) unit or by other processing elements known by those of ordinary skill in the art.

Apparatus 100 may further include interface 108 that receives the processed signals from the signal processing block 107. The interface 108 outputs the x-, y-, and z-directional data 109, on line 110. In one embodiment, interface 108 may be a universal serial bus (USB) interface. Alternatively, other interfaces known by those of ordinary skill in the art may be used as interface 108.

In one embodiment, front-end electronics 106, signal processing block 107, and interface 108 may be a USB controller, such as a microcontroller with a USB interface. The USB controller couples to an optical motion sensor 105 and receives raw data from the optical motion sensor 105. The USB controller may include DSP code to process the raw data received from the optical motion sensor 105, and output the positional information to a PC, workstation, gaming console, or other systems known by those of ordinary skill in the art.

In one embodiment, optical motion sensor 105 is used for sensing movement or transverse displacement of a surface member over a data input device (e.g., detector) by determining changes in phase angle of motion-dependent signals generated from light reflected from the surface member. The optical motion sensor 105 may include the following: an illuminator having a coherent light source and illumination optics to illuminate a portion of the surface; a detector having an array with a plurality of photosensitive elements, such as photodiodes; and a circuit configured to electrically couple or combine signals from each of the photosensitive elements to provide substantially sinusoidal first and second line signals from which a velocity of movement of the data input device along at least one axis can be calculated. The illuminator and the detector are configured to produce an intensity pattern on the array of light reflected from the illuminated portion of the surface. In one embodiment, the intensity pattern includes a number of speckles having a speckle period equal to twice an average speckle diameter, and the speckle period is roughly equal to the period of the detector array.

The component, v, of a velocity of movement of the data input device along the axis can be calculated, for example, using the following equation:

$$Velocity = FrameRate * \frac{M * DetectorPitch}{\tau} \quad (1)$$

where M*DetectorPitch is the spacing between two interconnected photosensitive elements, and FrameRate is the time between the previous two positive-going zero-crossings.

In one embodiment, the circuit to combine the photosensitive element signals to generate a line signal includes weighting circuitry to weight each signal by a primary or in-phase weighting factor (S1) and a quadrature weighting factor (S2) prior to combining the generate the line signal. Weighting factors (S1) and (S2) are calculated using the following equations:

$$S1 = \cos\frac{2\prod j}{M} \quad (2)$$

and $$S2 = \sin\frac{2\prod j}{M} \quad (3)$$

where j spans all photosensitive elements in a set from 0 to M−1.

In another embodiment, the circuit further includes a comparator for comparing a quality or characteristic of the first and second line signals, such as magnitude, and a selector for selecting as an output signal from the detector the line signal having the greatest or highest degree of the quality or characteristic.

Alternatively, the optical motion sensor may include a number of detector arrays, also known as linear comb arrays (LCAs), each with a number of photosensitive elements, arranged in a plane which is parallel to a plane of the surface member. At least two of the LCAs have photosensitive elements arranged along axes not parallel to one another. The optical motion sensor further includes front-end electronics adapted to provide at least two motion dependent signals from the number of LCAs, and signal processing electronics adapted to determine the displacement of the device relative to the surface using changes in phase angle of the motion-dependent signals. Each of the motion dependent signals is a weighted sum of outputs from a different combination of photosensitive elements from among the LCAs. Specific details regarding comb arrays are known to those of ordinary skill in the art, and have not been included so as not to obscure the discussion of the present embodiments.

The signal processing electronics may be adapted to calculate displacement of the data input device using the following equation:

$$Displacement(t_2, t_1) = \frac{M * DetectoWidth}{2 * pi * MagnificationFactor} * DeltaPhase(t_2, t_1) \quad (4)$$

where DeltaPhase is measured in radians, and $t_1$ and $t_2$ are the initial and final times, respectively, between which the displacement takes place.

In one embodiment, the front-end electronics are adapted to provide different weightings for each different combination of photosensitive elements.

In another embodiment, each of the combinations of photosensitive elements includes photosensitive elements from a single LCA, and each of the photosensitive elements is separated from one another along the axis of the LCA by a repeating predetermined period. The front-end electronics may be adapted to provide different weightings for different repeating predetermined periods. Alternatively, the front-end electronics may be adapted to provide an additional set of weighting for each photosensitive element that is selected to de-emphasize photosensitive elements at ends of the LCA. The sets of weighting may also be selected to reduce unwanted harmonics in the motion-dependent signals. Optionally, the different combination of photosensitive elements can include at least one shared photosensitive element.

In another embodiment, optical motion sensor 105 may include a detector with two or more different combinations of the same photosensitive elements may be used. This embodiment allows the reuse of the same outputs of the photosensitive elements in a single comb array electrically coupled in two or more configurations to generate multiple independent signals for motion estimation.

In this embodiment, two different speckle patterns are measured. Alternatively, we can use the same arrays and the same sections of the speckle pattern. This approach may have the advantage of saving photodiode space, and the leakage current associated with each photodiode. It also conserves photons, as smaller area on the silicon needs to be illuminated with the speckle pattern.

Alternatively, the detector values could be sampled individually or multiplexed and sequentially sampled using an analog-to-digital converter (ADC) and processed to generate the independent sums. In the previous implementation analog sums were followed by a shared time-multiplexed or multiple simultaneous ADC. Alternatively, other implementations known by those of ordinary skill in the art may be used to accomplish the same task, trading circuit complexity power and/or noise figure.

Figure 2:
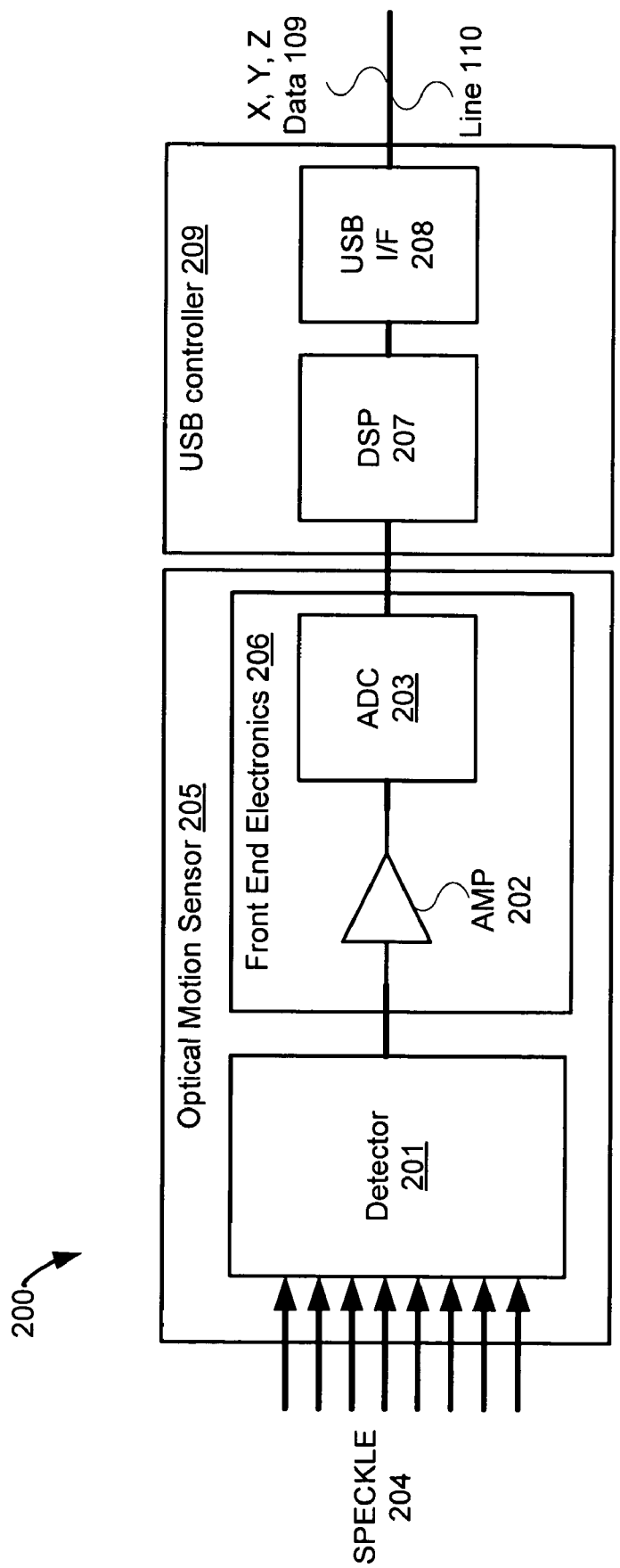
FIG. 2 illustrates a block diagram of an exemplary embodiment of an apparatus for determining displacement and absolute position of the surface member coupled to the user interface mechanism.

FIG. 2 illustrates a block diagram of an exemplary embodiment of an apparatus for determining displacement and absolute position of the surface member coupled to the user interface mechanism. Apparatus 200 includes light source 102, illumination optics 103, surface 101, and imaging optics 104 (not illustrated in FIG. 2). Apparatus 200 further includes optical motion sensor 205, which receives speckle 204 from the scattered light from surface 101, and USB controller 209. Optical motion sensor 205 includes detector 201 and front-end electronics 206. Optical motion sensor 205 receives speckle 204 on detector 201. Detector 201 transmits analog signals representative of the incremental displacement of surface 101 of the surface member with respect to the optical motion sensor 205 in the x-, y-, and z-directions. Front-end electronics 206 includes amplifier 202 and ADC 203 to amplify and convert the analog signals into one or more digital signals to be received by the USB controller 209. USB controller 209 includes DSP block 207 and USB interface (I/F) 208. DSP block 207 processes the one or more digital signals and outputs to the USB interface 208. The USB interface 208 outputs the x, y-, and z-displacement data 109, on line 110. DSP block 207 may be DSP code. Alternatively, the DSP block may be implemented in hardware. In one embodiment, DSP 207 and USB interface 208 may be a microcontroller having a USB interface, the microcontroller containing DSP code or hardware for processing the one or more analog signals. Alternatively, DSP block 207 and USB interface 208 may reside on same or different chips as known by those of ordinary skill in the art.

Figure 3:
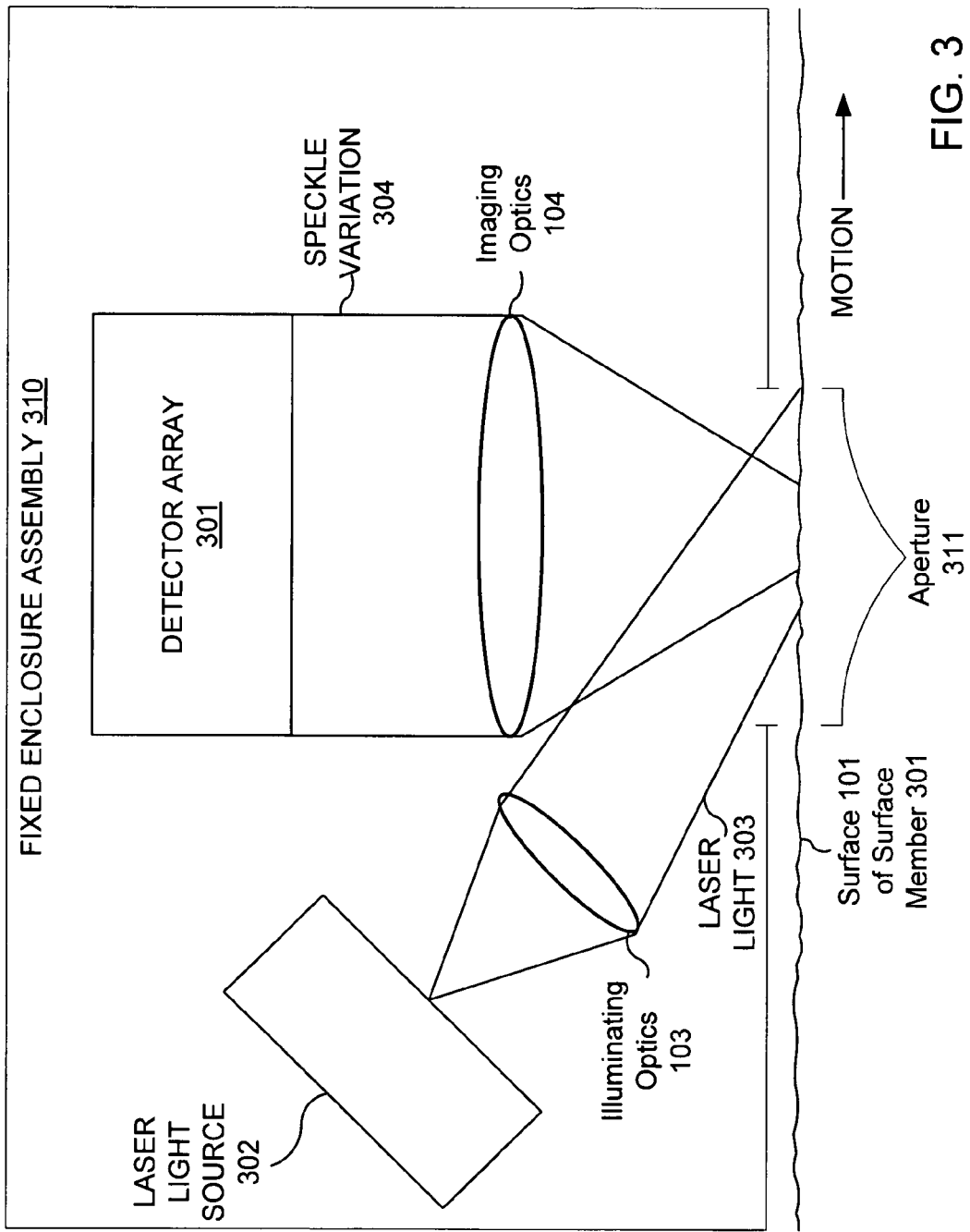
FIG. 3 illustrates one embodiment of a light source and detector array of the optical motion sensor for detecting incremental displacement of the surface of the surface member.

FIG. 3 illustrates one embodiment of a light source and detector of the optical motion sensor for detecting incremental displacement of the surface of the surface member. In this embodiment, the optical motion sensor relies on the use of laser speckle produced in photodetection. The speckle variation 304 is generated from a stationary laser light source 302, which transmits laser light 303 onto a moving surface member 301. The transmitted light is scattered by the moving surface member 301, having optically rough surface 101. Surface 101 of surface member 301 moves, according to the movement of the user interface mechanism (e.g., joystick handle), over the stationary laser light source 302 and stationary detector array 301 of the optical motion sensor 205. Laser 302, illumination optics 103, imaging optics 104, and detector array 301 may be positioned in fixed enclosure assembly 310. Fixed enclosure assembly 310 includes aperture 311 to allow light to enter/leave the fixed enclosure assembly 310 to/from surface 101 of surface member 301. The fixed enclosure assembly 310 and aperture 311 may be used to limit optical noise from being introduced into the apparatus.

In one embodiment, illumination optics 103 illuminate the light from the laser 302 on a part of the optically rough surface 101 and speckle variation 304 (scattered laser light) is imaged to the detector 201 using imaging optics 104. Alternatively, laser 302 transmits light to the surface 101 directly, and the detector array 202 receives the scattered light directly from the surface 101. When the user interface mechanism, and thereby the surface member 301, is moved, speckle variations 304 move correspondingly along the detector array 301.

In one exemplary embodiment, illumination optics 103 and imaging optics 104 may be transmission lenses, for example, cylindrical lenslet array (e.g., imaging optics 104) and spherical refractive lens (e.g., illumination optics 103). In this embodiment, the light emitted from a Vertical Cavity Surface Emitting Laser (VCSEL) (e.g., laser light source 302) is collimated by refractive lens and divided into multiple beams by the cylindrical lenslet array for illumination of the moving surface 101. The VCSEL illuminates a part of the moving surface 101 and speckle variation 304 (e.g., scattered laser light) is generated at an input plane parallel to the detector array 301. When the surface 101 is moved, the speckle variation 304 moves correspondingly along the input plane. The individual cylindrical lenslets direct light towards the refractive lens that refracts the light towards the detector array 301.

The laser speckle 304 generates high-contrast light-dark features with a wide range of spatial frequencies. The discussion herein describes how motion detection in one dimension (e.g., x-axis) is carried out. The configuration described herein for one dimension can be duplicated at right angles to the initial optics-detector array combination to permit full two-dimensional motion detection. Alternatively, additional detector arrays may be used to detect motion in multiple dimensions.

Speckle, as previously mentioned, is created when coherent laser light 305 illuminates on optically rough surface 101. An optically rough surface is a surface with imperfections approximately a wavelength of the light illuminated upon it.

Laser illumination of coherent light 305 presents uniform phase fronts at the optically rough surface 101. Optically rough surface 101 scatters the coherent light 305 with random phases, forming the speckle variation 304. This constructive and destructive interference and creates bright and dark speckles (similar to the fringes produced by a diffraction grating). These speckles follow surface movement of surface 101 to be detected by a light sensing circuit. Light sensing circuit may be detector array 301. Alternatively, light sensing circuit may be other types of detector known by those of ordinary skill in the art. Speckle-based optical navigation technology uses these effects to sense movement in a similar way to those used by traditional optical mouse sensors.

Figure 4:
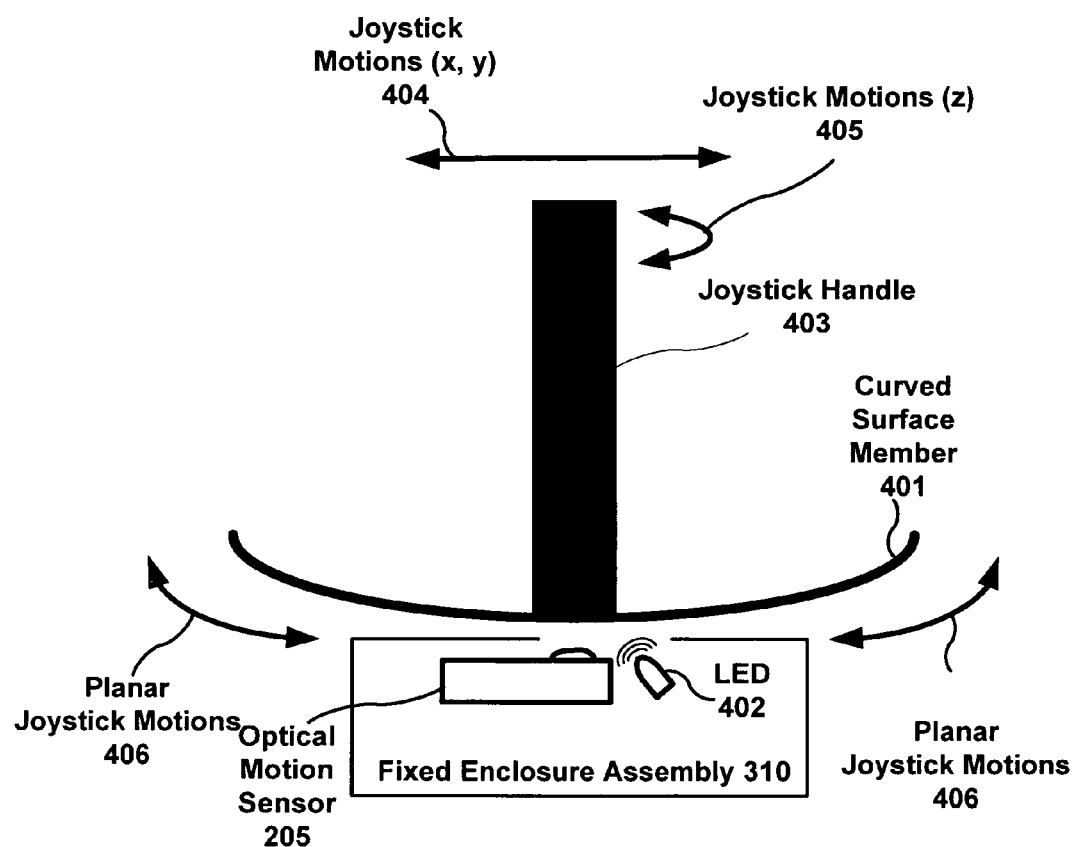
FIG. 4 illustrates one embodiment of a joystick handle coupled to a curved surface member.

FIG. 4 illustrates one embodiment of a joystick handle coupled to a curved surface member. Joystick handle 403 is coupled to surface member 401, having an optically rough surface, surface 101. Curved surface member 401 is positioned over a fixed enclosure assembly 310 such that curved surface member 401 moves over the optical motion sensor as the joystick handle 403 moves. Fixed enclosure assembly 310 may include optical motion sensor 205 and LED 402. Alternatively, the fixed enclosure assembly 310 may include optical motion sensor 105 and light source 102. Light source 102 may be, for example, laser light source 302.

The optical motion sensor 205 and associated DSP (not illustrated in FIG. 4) may detect the incremental joystick motions 404 in x-, and y-directions and the incremental joystick motions 405 in the z-direction. The optical motion sensor 205 and associated DSP may provide an accurate measure of x-, y-, and z-axis incremental planar joystick motions 406 of the curved surface member 401 relative to the optical motion sensor 205 in the fixed enclosure assembly. In other words, the optical motion sensor 205 and associated DSP may provide an accurate measure of the x-, y-, and z-axis incremental displacements of the curved surface member 401 and corresponding joystick handle 403. The optical motion sensor 205 and associated DSP may also determine the absolute position of the surface member 401 and associated joystick handle 403 using the incremental displacement of the curved surface member 401. To determine the absolute position, the optical motion sensor 205 and associated DSP may detect a fixed reference point as a center point that represents when the joystick handle is in a rest position, or when the x-, y-, and z-coordinates are (0, 0, 0). By periodically detecting this fixed reference point, "drift" in the positional output of the joystick handle 403 may be reduced, increasing the tracking accuracy and tracking precision of the surface member 401 of the joystick handle 403 using the optical motion sensor 205.

Figure 5:
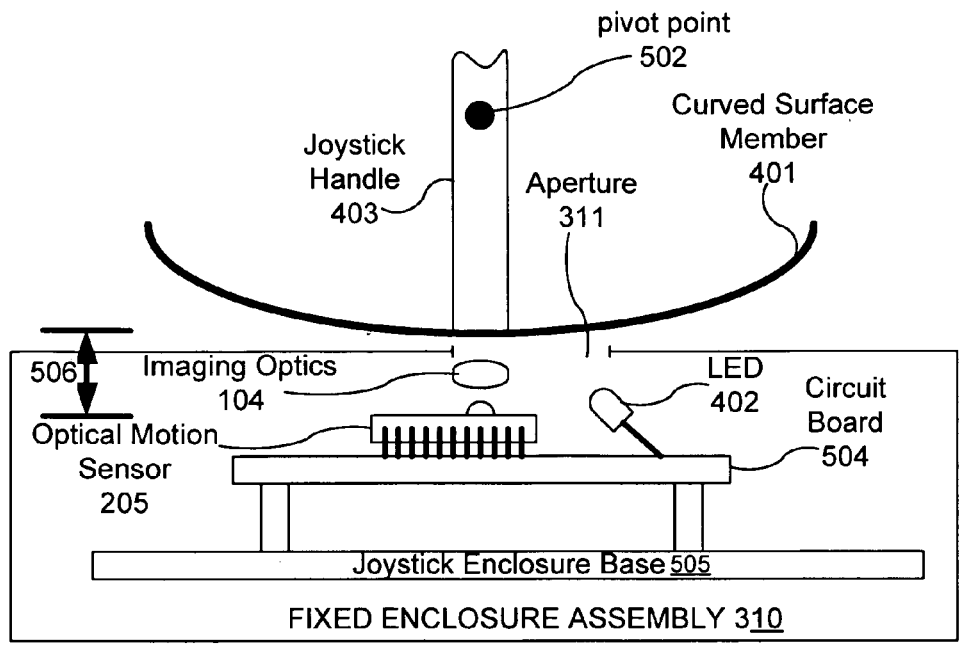
FIG. 5 illustrates another embodiment of a joystick handle coupled to a curved surface member.

FIG. 5 illustrates another embodiment of a joystick handle coupled to a curved surface member. In this embodiment, joystick handle 403 is directly coupled to curved surface member 401, having optically rough surface 101. Curved surface member 401 is positioned over a fixed enclosure assembly 310 such that curved surface member 401 moves over the optical motion sensor 205 as the joystick handle 403 moves. Fixed enclosure assembly 310 may include optical motion sensor 205 and LED 402 mounted to circuit board 504. Circuit board 504 may be attached to joystick enclosure base 505. Fixed enclosure assembly 310 may further include imaging optics 104, positioned between the optical motion sensor 205 and the curved surface member 401. Fixed enclosure assembly 310 may also include aperture 311 to allow light to enter/leave the fixed enclosure assembly 310 to/from surface 101 of curved surface member 401. Alternatively, the fixed enclosure assembly 310 may include optical motion sensor 105, illumination optics 103, imaging optics 104, and light source 102. Light source 102 may be, for example, laser light source 302.

Joystick handle 403 may include a pivot point 502. In one embodiment, pivot point 502 is a 2-axis pivot point to facilitate the joystick motions 404 of the joystick handle 403 in the x-, and y-directions. Alternatively, pivot point 502 may include a 3-axis pivot point to facilitate the joystick motions 404 and 405 of the joystick handle 403 in the x-, y- and z-directions. In one exemplary embodiment, pivot point 502 may be a gimbal. Alternatively, partial ball and socket joint or other mechanical assemblies known by those of ordinary skill in the art may be used to facilitate the joystick motions 404 and 405 in the x-, y-, and z-directions.

It should be noted that the joystick assembly may include one or more springs that may exert a force towards the center position, forcing the joystick handle to the center or idle position when the user's hand is not on the joystick. The one or more springs may provide the user with some mechanical feedback (e.g., spring return to center force may be proportional to the handle displacement from rest). Different spring designs and arrangements are well known by those of ordinary skill in the art. Accordingly, details regarding such designs and arrangements have not been included so as to not obscure the present embodiments. Other components of joystick assemblies, known by those of ordinary skill in the art, may be used.

As previously described, the optical motion sensor 205 and associated DSP (not illustrated in FIG. 5) may detect the incremental joystick motions 404 in x-, and y-directions and the incremental joystick motions 405 in the z-direction. The optical motion sensor 205 and associated DSP may provide an accurate measure of x-, y-, and z-axis incremental planar joystick motions 406 of the curved surface member 401 relative to the optical motion sensor 205 in the fixed enclosure assembly 310. In other words, the optical motion sensor 205 and associated DSP may provide an accurate measure of the x-, y-, and z-axis incremental displacements of the curved surface member 401 and corresponding joystick handle 403. The optical motion sensor 205 and associated DSP may also determine the absolute position of the curved surface member 401 and associated joystick handle 403 using the incremental displacement of the curved surface member 401. To determine the absolute position, the optical motion sensor 205 and associated DSP may detect a fixed reference point as a center point that represents when the joystick handle is in a rest position, or when the output x-, y-, and z-coordinates from the DSP are (0, 0, 0). By periodically detecting this fixed reference point, "drift" in the positional output of the joystick handle 403 may be reduced, increasing the tracking accuracy of the curved surface member 401 of the joystick handle 403 using the optical motion sensor 205.

In one embodiment, the curved surface member 401 has a curved surface such that as the joystick handle 403 and the corresponding curved surface member 401 are moved, the distance 506 between the curved surface member 401 and the fixed optical sensor 205 remains substantially constant.

Figure 6:
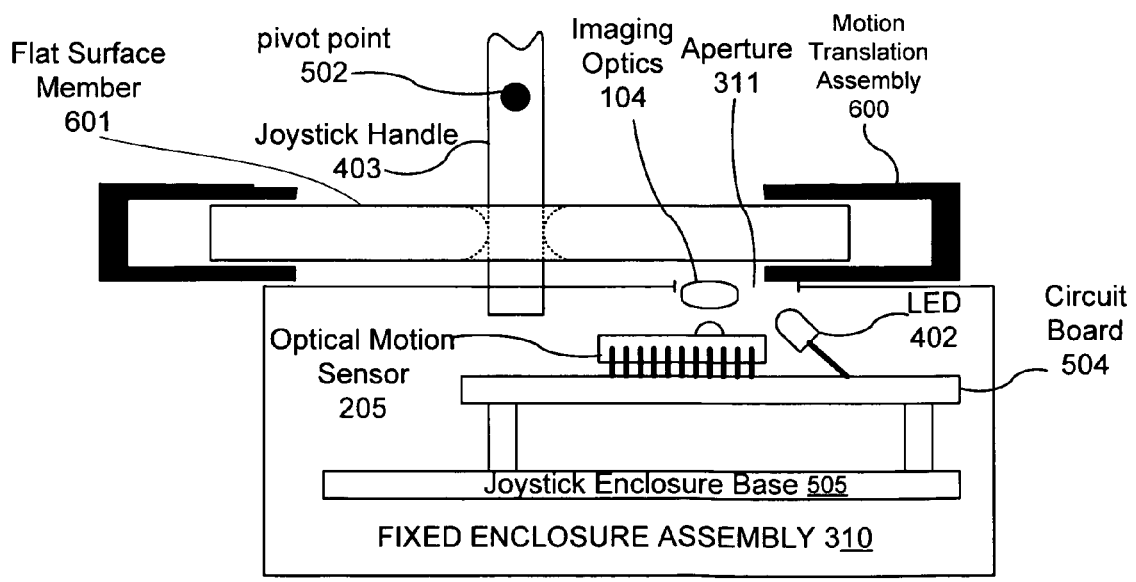
FIG. 6 illustrates another embodiment of a joystick handle coupled to a flat surface member having a motion translation assembly.

FIG. 6 illustrates another embodiment of a joystick handle coupled to a flat surface member having a motion translation assembly. The motion translation assembly 600 may be coupled to the joystick handle 403 to translate x-, y-, and z-motions of the joystick handle 403 into planar x-, y-, and z-axis (e.g., twist axis) motions. The motion translation assembly 600 having a flat surface member 601 is operatively coupled to move over the optical mouse sensor 205. In this embodiment, joystick handle 403 is coupled to flat surface member 601, having an optically rough surface, surface 101. In one embodiment, the joystick handle 403 may be coupled to flat surface 601 by a mechanical apparatus, motion translation assembly 600 to translate the joystick motions 404 and 405 of the joystick handle 403 in the x-, y-, and z-directions into planar joystick motions 406, which may include displacement of the flat surface member 601 in the x- and y-directions. Alternatively, the planar joystick motions 406 may include a "twist" axis motion, or z-direction displacement of the flat surface member 601 in addition to the displacements of the flat surface member 601 in the x- and y-directions.

In one embodiment, the motion translation assembly 600 includes the following: a shaft having a pivot point to allow tilt of the handle in any combination of x- and y-directions; a plate having a hole, the shaft is placed through the hole; and a set of guide rails to allow the plate to move only in a plane in both x- and y-directions.

Flat surface member 601 is positioned over a fixed enclosure assembly 310 such that flat surface member 601 moves over the optical motion sensor 205 as the joystick handle 403 moves. Fixed enclosure assembly 310 may include optical motion sensor 205 and LED 402 mounted to circuit board 504. Circuit board 504 may be attached to joystick enclosure base 505. Fixed enclosure assembly 310 may further include imaging optics 104, positioned between the optical motion sensor 205 and the curved surface member 401. Fixed enclosure assembly 310 may also include aperture 311 to allow light to enter/leave the fixed enclosure assembly 310 to/from surface 101 of flat surface member 601. Alternatively, the fixed enclosure assembly 310 may include optical motion sensor 105, illumination optics 103, imaging optics 104, and light source 102. Light source 102 may be, for example, laser light source 302.

Joystick handle 403 may include a pivot point 502. In one embodiment, pivot point 502 is a 2-axis pivot point to facilitate the joystick motions 404 of the joystick handle 403 in the x-, and y-directions. Alternatively, pivot point 502 may include a 3-axis pivot point to facilitate the joystick motions 404 and 405 of the joystick handle 403 in the x-, y- and z-directions. In one exemplary embodiment, pivot point 502 may be a gimbal. Alternatively, other known mechanical assemblies may be used to facilitate the joystick motions 404 and 405 in the x-, y-, and z-directions.

As previously described, the optical motion sensor 205 and associated DSP (not illustrated in FIG. 6) may detect the incremental joystick motions 404 in x-, and y-directions and the incremental joystick motions 405 in the z-direction. The optical motion sensor 205 and associated DSP may provide an accurate measure of x-, y-, and z-axis incremental planar joystick motions 406 of the flat surface member 601 relative to the optical motion sensor 205 in the fixed enclosure assembly. In other words, the optical motion sensor 205 and associated DSP may provide an accurate measure of the x-, y-, and z-axis incremental displacements of the flat surface member 601 and corresponding joystick handle 403. The optical motion sensor 205 and associated DSP may also determine the absolute position of the flat surface member 601 and associated joystick handle 403 using the incremental displacement of the flat surface member 601. To determine the absolute position, the optical motion sensor 205 and associated DSP may detect a fixed reference point as a center point that represents when the joystick handle is in a rest position, or when the x-, y-, and z-coordinates are (0, 0, 0). By periodically detecting this fixed reference point, "drift" in the positional output of the joystick handle 403 may be reduced, increasing the tracking accuracy of the flat surface member 601 of the joystick handle 403 using the optical motion sensor 205.

It should be noted that embodiments of FIG. 6 include a single linkage, motion translation assembly 600, and thus, includes only a single point of backlash. In contrast, the conventional potentiometer-based joysticks include two linkages, one to translation the x- and y-motions into planar motions and one to move the potentiometers, and thus, have at least two corresponding points of backlash. The backlashes introduce mechanical losses. In the present embodiments, mechanical loss may be reduced by reducing the number of backlash points. The present embodiments may require less demanding tolerances than the conventional potentiometer-based joysticks, and consequently, provide improved manufacturing benefits.

Figure 8:
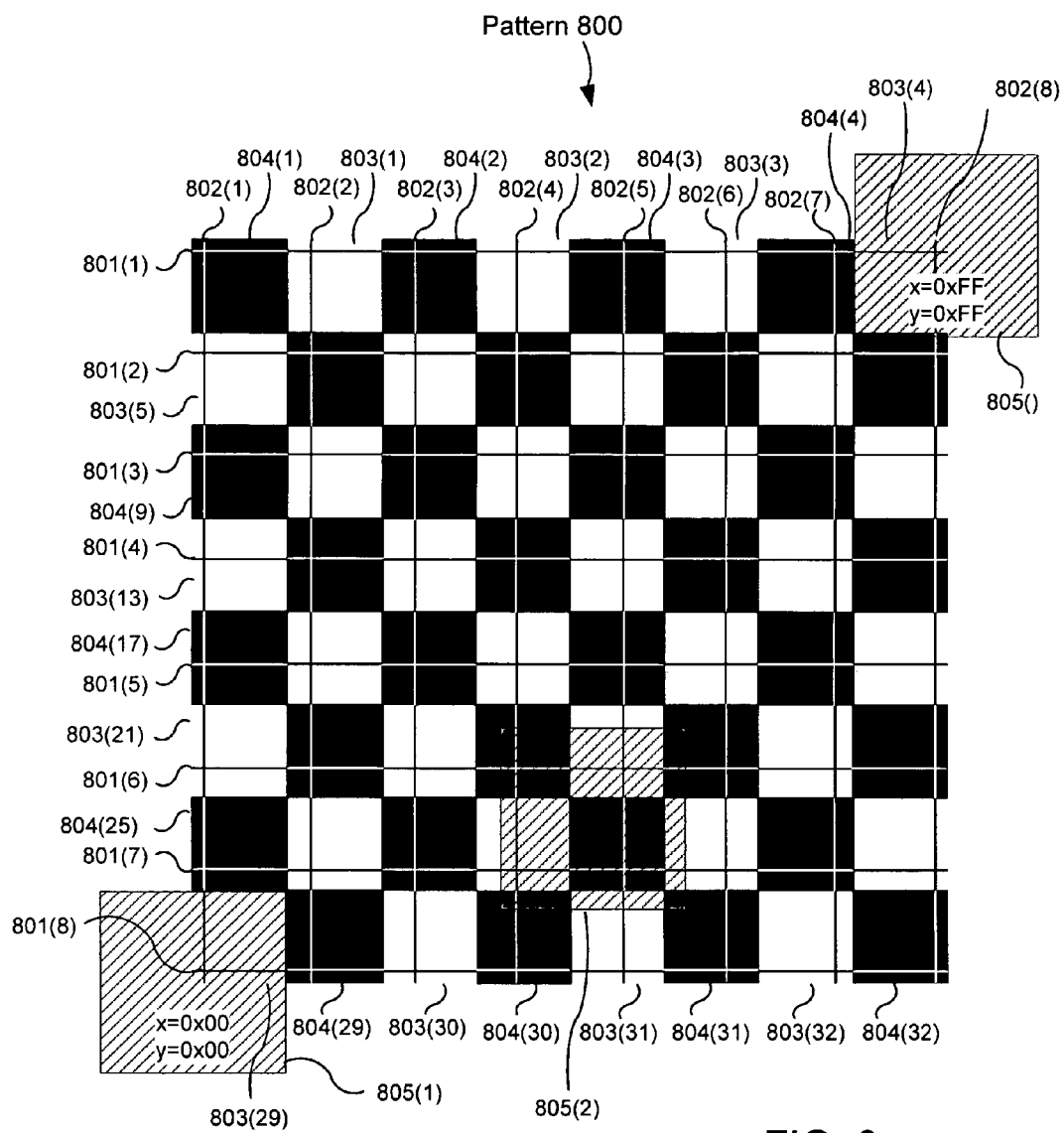
FIG. 8 illustrates one exemplary embodiment of three fields of view of the image sensor over a pattern printed on a surface member of a user interface mechanism.
Figure 9:
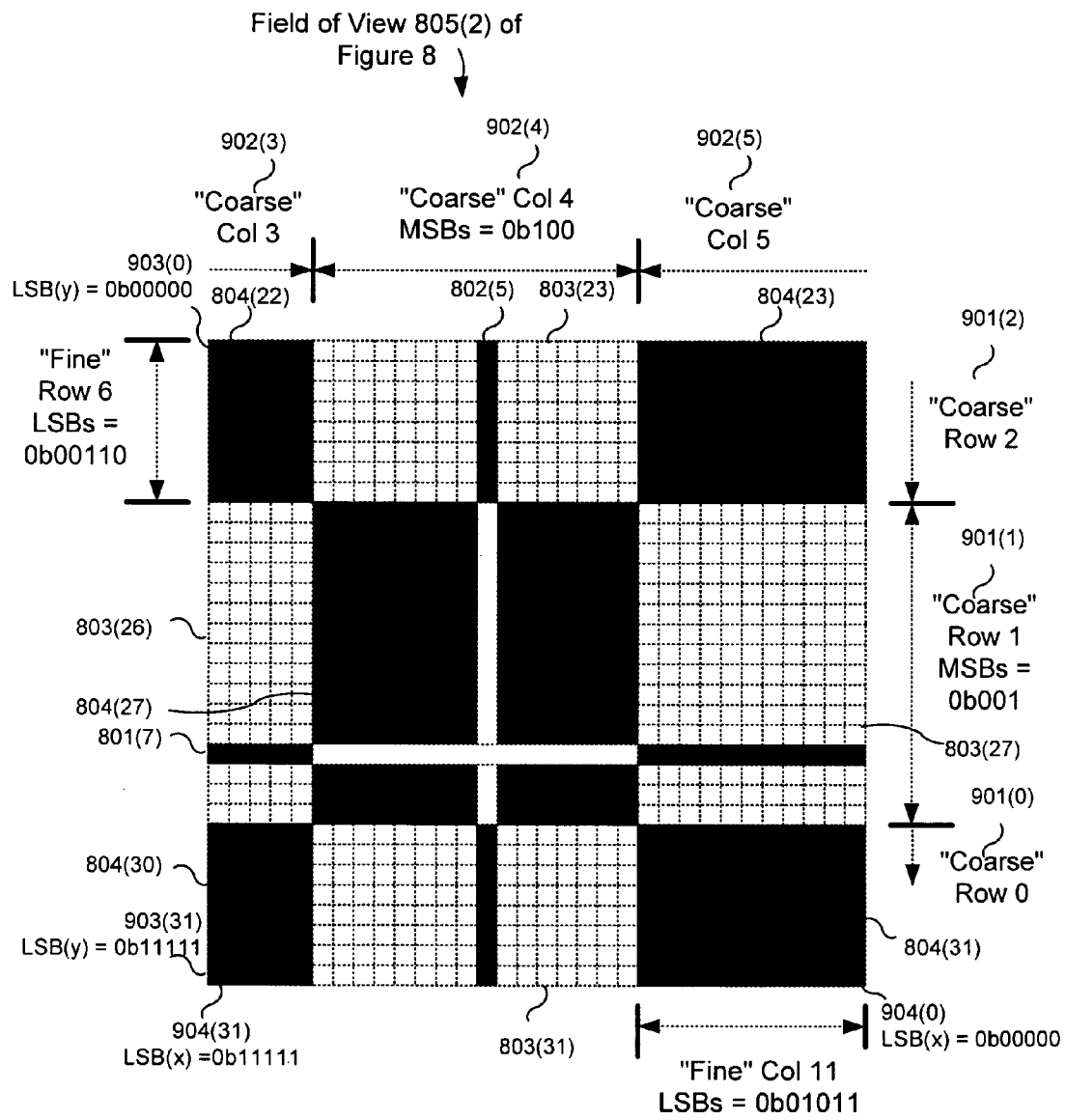
FIG. 9 illustrates a close-up view of one embodiment of an image seen in one of the field of views of the image sensor of FIG. 8.

It should also be noted that the embodiments described with respect to FIG. 5 have simpler implementations than the embodiments described with respect to FIG. 6 because the joystick handle 403 couples directly to the curved surface member 401, without the use of a motion translation assembly 600, as described with respect to FIGS. 8 and 9. By directly coupling the joystick handle 403 to the curved surface member 401, the curved surface member 401 translates the joystick motions 404 and 405 of the joystick handle 403 in the x-, y-, and z-directions into planar joystick motions 406, which may include displacement of the curved surface member 401 in the x- and y-directions. The embodiments of FIG. 5 have no points of backlash, as compared to the single point of backlash of the single linkage of FIG. 6, and the at least two points of backlash of the two linkages of the conventional potentiometer-based joysticks. Alternatively, the planar joystick motions 406 may include a "twist" axis motion, or z-direction displacement of the curved surface member 401 in addition to the displacements of the curved surface member 401 in the x- and y-directions.

Figure 7A:
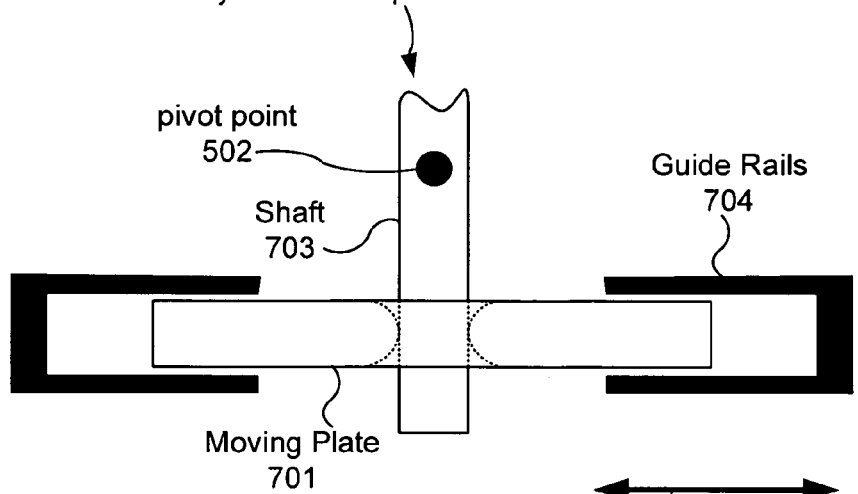
FIG. 7A illustrates one embodiment of a motion translation assembly in three different positions.
Figure 7A:
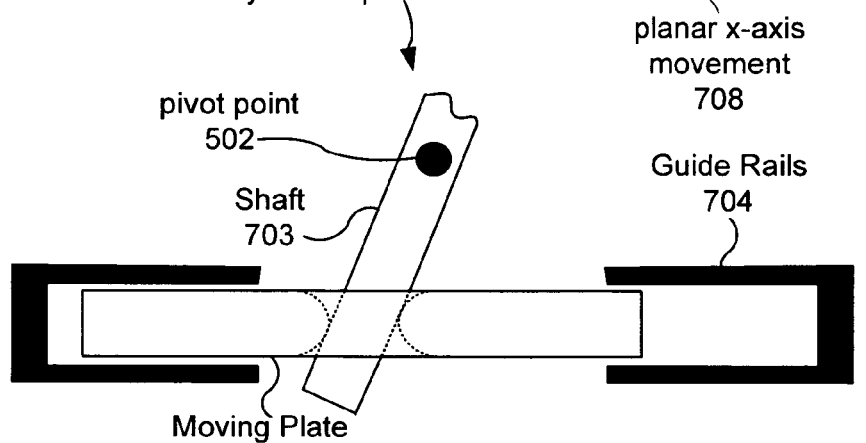
Figure 7A:
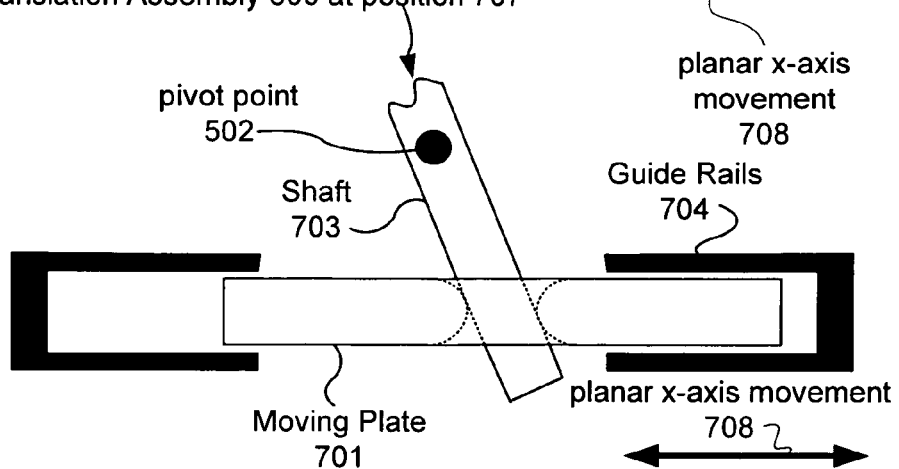

FIG. 7A illustrates one embodiment of a motion translation assembly in three different positions. Motion translation assembly 600 includes a shaft 701 of the joystick handle 403, which has a pivot point 502 allowing the shaft 701 of joystick handle 403 to tilt in any combination of x- and y-directions. For example, the pivot point 502 may be a gimbal or partial ball and socket joint. Motion translation assembly 600 may further include a moving plate 701 with a hole in it through which the shaft 703 passes, and a set of guide rails 704, which allow the moving plate 701 to move in both x- and y-directions (e.g., joystick motions 404), but constrained to planer movement (e.g., planar joystick motion 406).

FIG. 7A illustrates the motion translation assembly 600 in three different positions, rest position 705, position 706, and position 707. Rest position 705 may be when the moving plate 701 is at rest, or is not being driven by the shaft 703 of the joystick handle 403. When the moving plate is in rest position 705, the corresponding output x-, y-, and z-coordinates from the DSP are (0, 0, 0). As the shaft 703 tilts from the rest position 705 to position 706, the shaft 703 moves the moving plate 701 to facilitate planar x-axis movement 708 along the x-axis in one direction. As the shaft 703 tilts from the rest position 705 to position 707, the shaft 703 moves the moving plate 701 to facilitate planar x-axis movement 708 along the x-axis in the other direction.

Although described as facilitating motion of the moving plate 701 in the x-direction, motion translation assembly 600 of FIG. 7A also facilitates motion of the moving plate 701 in the y-direction.

It should be noted that although the motion translation assembly 600 has been illustrated to facilitate both x- and y-axis movement (e.g., joystick motions 404), alternatively, motion translation assembly may be configured to facilitate x-, y-, and z-axis movements (e.g., joystick motions 404 and 405).

Figure 7B:
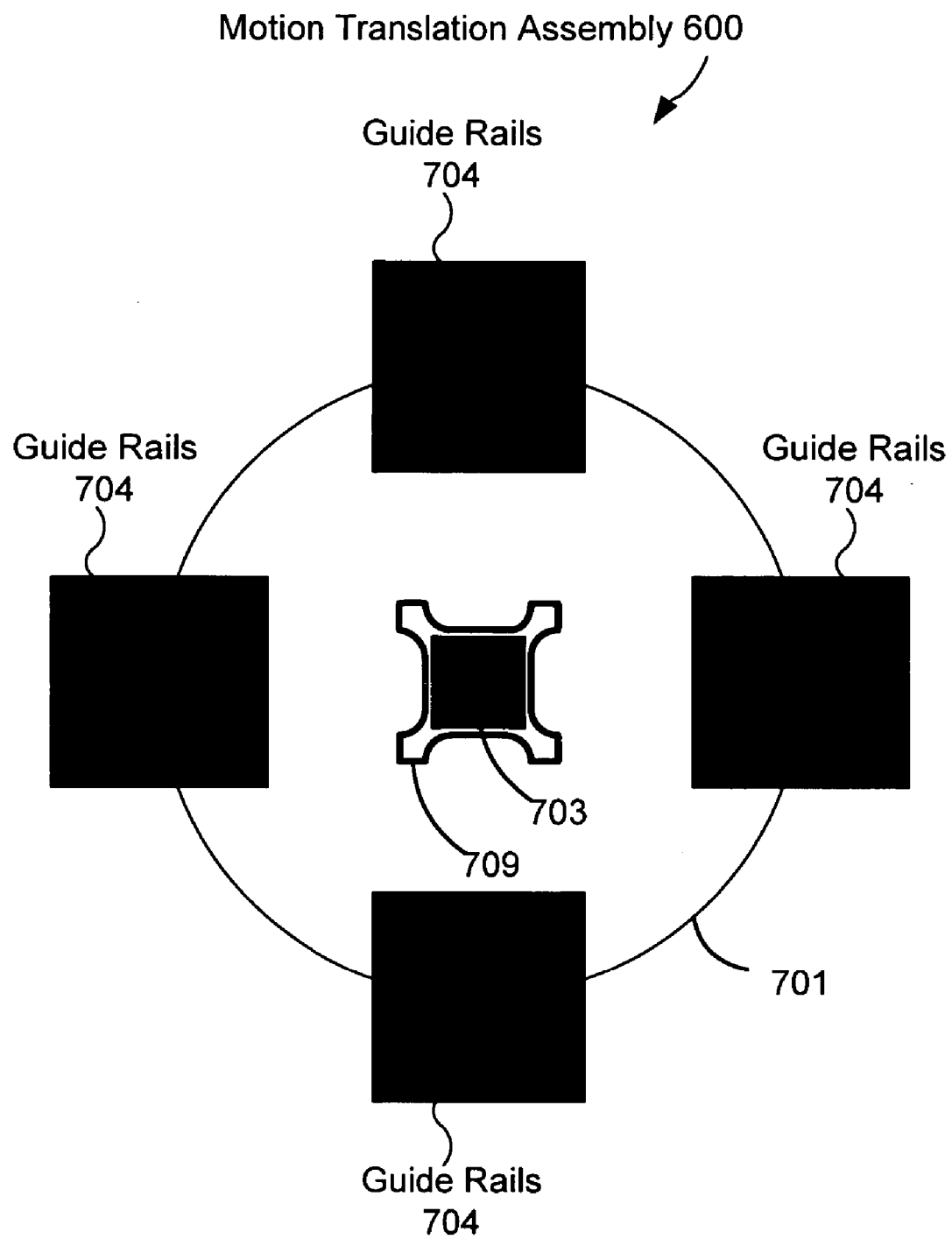
FIG. 7B illustrates another embodiment of a motion translation assembly.

FIG. 7B illustrates another embodiment of a motion translation assembly. Motion translation assembly 600 of FIG. 7B includes moving plate 701 with a suitable hole 709 in it through which a square or rectangular shaft passes, shaft 703, and a set of guide rails 704, which allow the moving plate 701 to move in x-, y- and z-directions (e.g., joystick motions 404 and 405), but constrained to planer movement (e.g., planar joystick motion 406). By rotating or twisting the square or rectangular shaft 703 of the joystick handle 403 in the z-axis, the surface member 601 (e.g., moving plate 701) is rotated in a planar z-axis. Accordingly, motion translation assembly 600 of FIG. 7B facilitates x-, y-, and z-axis movements (e.g., joystick motions 404 and 405). Alternatively, other motion translation assemblies known by those of ordinary skill in the art may be used to translate the motions of the joystick handle into planar joystick motions.

Optical mouse sensors may only be capable of detecting incremental motion of the surface 101, and not absolute position. In one embodiment, in order to determine an absolute position of the surface 101 coupled to the user interface mechanism (e.g., joystick), the optical motion sensor 205 may include means of detecting a fixed reference point or center marker. As previously mentioned, optical mouse sensors do not track motion with 100% accuracy. Thus, in one embodiment, the optical motion sensor 205 may periodically detect the reference point. Without periodically detecting the reference point, the output of the user interface mechanism may exhibit "drift," because of tracking inaccuracy. By periodically detecting the reference point, the drift, due to tracking inaccuracy of the optical mouse sensor, may be reduced.

It should be noted that tracking inaccuracy in optical mice mainly depends on the tracking surface and speed of movement over the surface. Drift may be most noticeable near and at the center (idle) point or rest position, so making the reference point at the center point or rest position may ensure that the drift is corrected sufficiently often. In one embodiment, by making the reference point at the rest position, the inaccuracy (e.g., "loss of counts") may be reduced. In another embodiment, the surface member may be optimally designed to reduce the inaccuracy (e.g., "loss of counts") to be quite small, allowing even infrequent updating of the reference point to keep the drift within acceptable levels.

In one embodiment, for x- and y-motion, the reference point may be the center point of each axis or rest position. Because of the nature of optical motion sensing, the reflectiveness of the surface 101, which is moved over the optical motion sensor 205, may readily be measured.

In one embodiment, the optical motion sensor 105 may include a register, which contains duty cycle or light intensity information in order to generate a duty cycle control signal to control a brightness of the light source 102. The duty cycle may be used to distinguish microscopic variations in the reflectiveness of the surface 101. The duty cycle or shutter control may be used to provide optimal contrast for the images processed by the optical motion sensor 105 by controlling the brightness of the light source 102. The duty cycle has a long duty cycle when the optical motion sensor is detecting a dark variation in the speckle, and a short duty cycle when detecting a light variation in the speckle. In other words, when the optical motion sensor 105 is over a dark-colored area of the surface 101, the optical motion sensor 105 increases the brightness of the light source 102. When the optical motion sensor 105 is over a light-colored area of surface 101, the optical motion sensor 105 decreases the brightness of the light source 102. The information regarding the duty cycle or shutter control of the light source 102 may be stored in a register to be read and processed by the processing signal block to determine when the optical motion sensor 105 is detecting a light-colored surface or a dark-colored surface. The duty cycle of the light source may include a first period or first value when the optical motion sensor 105 detects the reference point, the reference point being a dark-colored area, and a second period or second value when the optical motion sensor 105 does not detect the reference point, or in other words, when the optical motion sensor 105 detects the light-colored areas surrounding the dark-colored reference point.

In one embodiment, the duty cycle may be used to detect fixed features on a surface. In another embodiment, the duty cycle may be used to detect a fixed reference point or center marker. The reference point may be a dark-colored dot or alternatively, it may be a dark-colored cross. In other embodiments, the duty cycle may be used to detect dark-colored and light-colored lines superimposed upon light-colored and dark-colored blocks, respectively. Alternatively, other dark and light features may be used to detect a reference position for recalibrating the accumulated counts of the net movement in the x-, y-, and z-axes. As previously mentioned, mouse applications have a loose count of the net movement, meaning error exists in the net movement. This error is conventionally corrected via the user as the negative feedback operation. However, by periodically detecting the reference position the counts in the x-, y-, and z-directions may be reset, increasing the accuracy of tracking, reducing drift, and determining the absolute position of the surface as it is moved over the fixed optical motion sensor.

In one exemplary embodiment, in order to conserve power, the illumination from the light source 102 may be deliberately dimmed when moving over a light-colored surface and brightened when moving over a dark-colored surface. For example, algorithms within a mouse sensor automatically vary either the intensity, or the duty cycle of the light source 102 to maintain optimal performance depending on the reflectivity (e.g., lightness/darkness) of the surface 101. Information about the reflectivity (e.g., lightness/darkness) of the surface 101 may be already available from the mouse sensor, simply by reading a register in the mouse sensor that controls the intensity or duty cycle of the light source 102.

In one embodiment, the surface 101 of surface member 301 (e.g., curved surface member 401 or flat surface member 601) coupled to the user interface mechanism (e.g., joystick handle 403) may be mainly light-colored (e.g., white) with a dark-colored reference point (e.g., black) at the point on the surface 101 that corresponded to the center position or rest position of the user interface mechanism (e.g., joystick handle 403). The optical motion sensor 105 may detect when the user interface mechanism (e.g., joystick handle 403) handle is centered. Correspondingly, the user interface mechanism, including signal processing block 107 may reset the displacement counts for both x- and y-axes, representative of the incremental displacements (e.g., planar joystick motions 406), to zero whenever the optical motion sensor 105 detects the dark-colored reference point on surface 101.

In one embodiment, the fixed reference point or center marker may have a circular shape, for example, a dark-colored spot. Alternatively, the reference point or center marker may have a cross shape, for example, a dark-colored cross. The fixed reference point or center maker may correspond to a centered- or rest position of the user interface mechanism.

In an alternative embodiment, the optical motion sensor 105 may have a simple image sensor, having a field of view to detect a pattern printed on the surface moving over the optical motion sensor 105.

In one embodiment, the printed pattern may be a checkerboard pattern. The checkerboard pattern allows the optical motion sensor to have a simpler design than the optical mouse sensor because the sensor may be designed specifically for the absolute position of the user interface mechanism (e.g., joystick handle). In this embodiment, the optical motion sensor may include a photoarray image sensor, having a specific resolution or field of view. A processing element may be coupled to the optical motion sensor and may include algorithms for detecting lines superimposed in different line locations within the checkerboard pattern.

Figure 10:
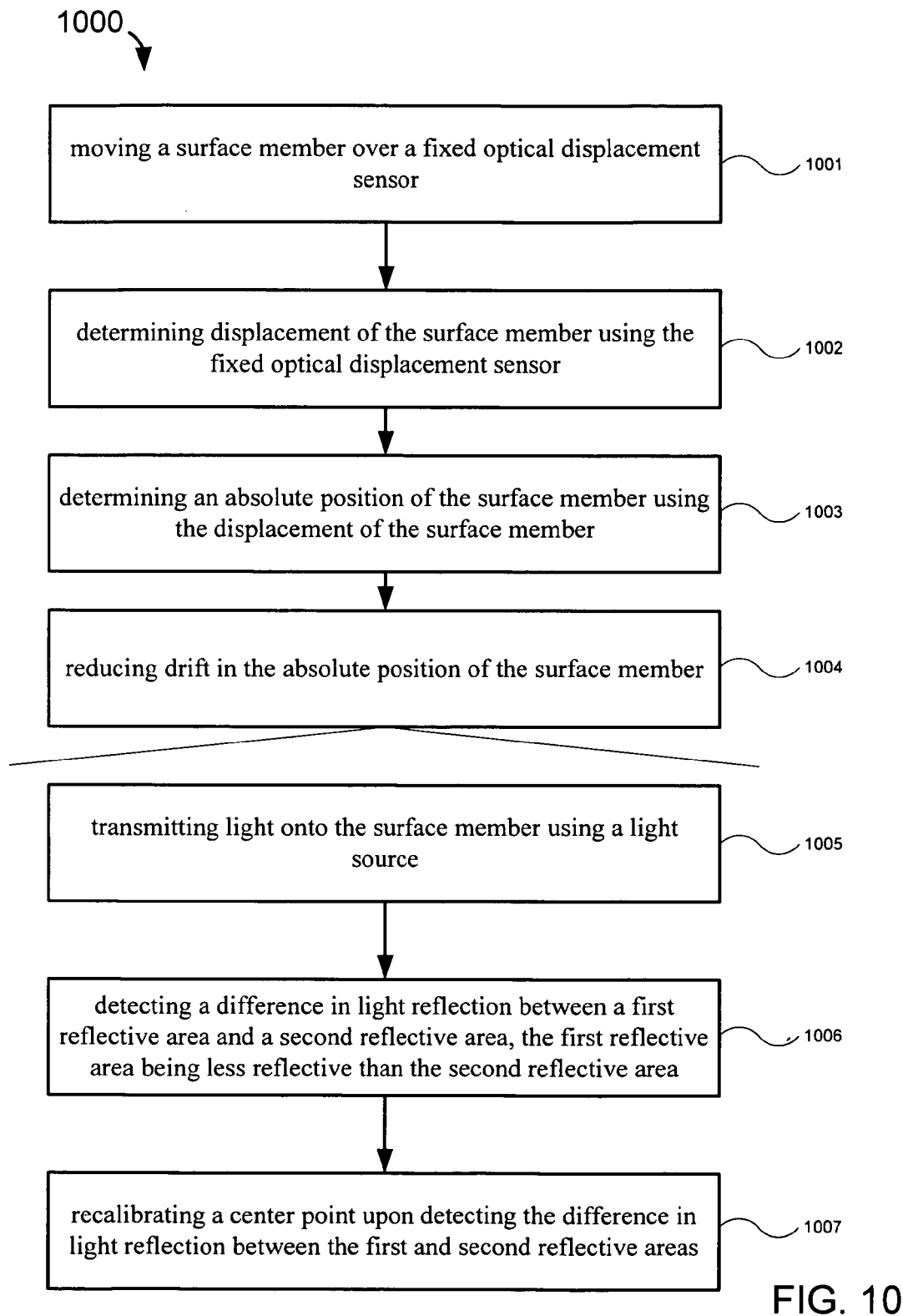
FIG. 10 illustrates a flow chart diagram of one embodiment of a method for determining displacement of a surface member coupled to a user interface using a fixed optical motion sensor.
Figure 11:
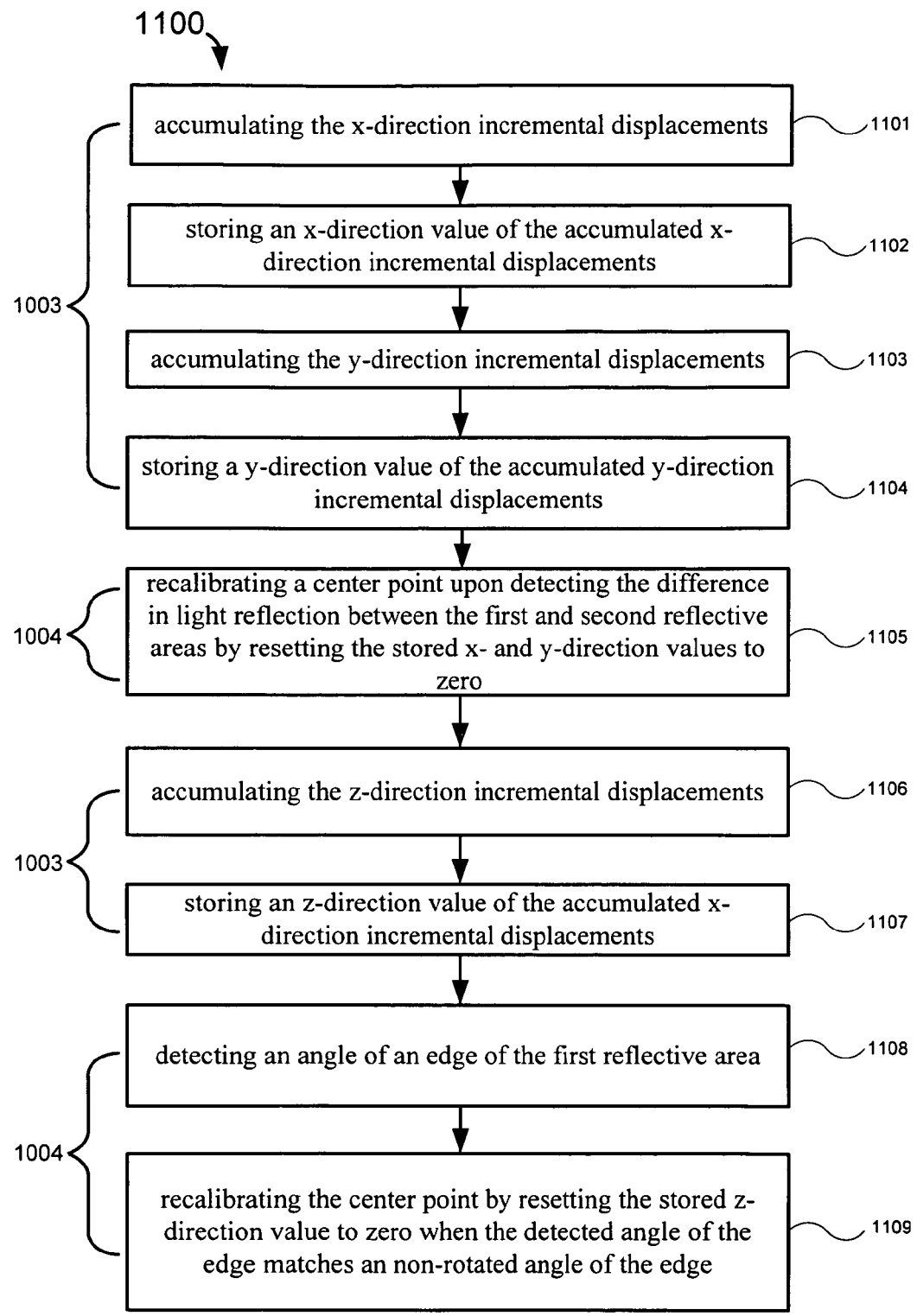
FIG. 11 illustrates a flow chart diagram of one embodiment of a method for determining an absolute position of a surface member coupled to a user interface in an x-/y-plane.

In one embodiment, the optical motion sensor may have a field of view of 32×32 pixels. Alternatively, the field of view may be 22×22, 64×64, or 21×21 pixels or other sizes known by those of ordinary skill in the art. FIGS. 10 and 11 illustrate and describe one exemplary embodiment, of a field of view of 32×32 pixels.

FIG. 8 illustrates one exemplary embodiment of three fields of view of the image sensor over a pattern printed on a surface member of a user interface mechanism. Surface 101 has a pattern 800 printed on surface 101 of surface member 301. In this exemplary embodiment, optical image sensor has a 32×32 field of view, having a fine grain resolution (e.g., 5 bits) and a course grain resolution (e.g., 3 bits), totaling 8 bits for each the x-, and y-coordinates. Pattern 800 includes eight horizontal lines 801(1)-801(8) and vertical lines 802(1)-802(8), superimposed on a checkerboard pattern having alternating blocks, light-colored blocks 803(1)-803(32), and dark-colored blocks 804(1)-804(32). Portions of the horizontal lines 801(1)-801(8) that are superimposed over the light-colored blocks 803(1)-803(32) are dark-colored lines; and portions of the horizontal lines 801(1)-801(8) that are superimposed over the dark-colored blocks 804(1)-804(32) are light-colored lines. Portions of the vertical lines 802(1)-802(8) that are superimposed over the light-colored blocks 803(1)-803(32) are dark-colored lines; and portions of the vertical lines 802(1)-801(8) that are superimposed over the dark-colored blocks 804(1)-804(32) are light-colored lines.

Image sensor may be moved over the pattern 800 printed on surface 101. As the image sensor is moved, the field of view of the image sensor moves accordingly. The field of view of image sensor is used to capture an image of a portion of the underlying pattern 800. By determining characteristics of the vertical and horizontal lines superimposed upon the light- and dark-colored blocks, the position of the image sensor may be determined with respect to the pattern 800 printed on surface 101. In other words, the absolute position of the user interface mechanism may be determined by detecting the horizontal and vertical lines within the light- and dark-colored blocks.

In this exemplary embodiment, three exemplary fields of views 805(1)-805(3) of the image sensor have been illustrated in FIG. 8. Each field of view has a corresponding x- and y-coordinate or location. For example, field of view 805(1) represents the image sensor being moved over the top of the bottom left corner of the pattern 800. The field of view 805(1) includes light-colored block 803(29) and dark-colored portions of the vertical line 802(1) and horizontal line 801(8). Upon detecting this portion of the pattern 800, including the intersection of the vertical line 802(1) and horizontal line 801(8) within light-colored block 803(29), the image sensor outputs an x-coordinate of 0x00 (i.e., x=0x00) hexadecimal (i.e., 00000000 binary) and a y-coordinate of 0x00 (i.e., x=0x00) hexadecimal (i.e., 00000000 binary).

Field of view 805(3) represents the image sensor being moved over the top of the top right corner of the pattern 800. The field of view 805(3) includes light-colored block 803(4) and dark-colored portions of the vertical line 802(8) and horizontal line 801(1). Upon detecting this portion of the pattern 800, including the intersection of the vertical line 802(8) and horizontal line 801(1) within light-colored block 803(4), the image sensor outputs an x-coordinate of 0xFF (i.e., x=0xFF) hexadecimal (i.e., 11111111 binary) and a y-coordinate of 0xFF(i.e., x=0xFF) hexadecimal (i.e., 11111111 binary).

Field of view 805(2) represents the image sensor being moved over the top of the center, bottom half of the pattern 800. The field of view 805(2) includes portions of light-colored blocks 803(23), 803(26), and 803(27). Field of view 805(2) also includes dark-colored portions of the vertical line 802(5) and horizontal line 801(6) within light-colored block 803(23), dark-colored portions of the vertical line 802(4) and horizontal line 801(7) within light-colored block 803(26), and dark-colored portions of the horizontal line 801(7) within light-colored block 803(27). Field of view 805(2) also includes light-colored portions of the vertical line 802(5) and horizontal line 801(7) within dark-colored block 802(27). Upon detecting this portion of the pattern 800, including the intersection of the light-colored portions of vertical line 802(5) and horizontal line 801(7) within the dark-colored block 802(27), the image sensor outputs an x-coordinate of 0x93 (i.e., x=0x93) hexadecimal (i.e., x=0b10010011 binary) and a y-coordinate of 0x33 (i.e., y=0x33) hexadecimal (i.e., y=0b00110011 binary).

In another exemplary embodiment, an edge of dark-colored block 802(27) may be detected. In this embodiment, for the x-coordinate, the "coarse" position is the 5th from the left, so with the left-most column being 0, the coarse x position is 4. The edge of the coarse checkerboard squares is between the 12th and 13th pixels in from the right hand side of the field of view, with the first pixel in being 0, so the fine x co-ordinate is 11. For the y-coordinate, the coarse and fine co-ordinates are similarly 1 and 6 respectively. Accordingly, the image sensor outputs an x-coordinate of 0x8B (i.e., x=0x8B) hexadecimal (i.e., x=0b10001011 binary) and a y-coordinate of 0x26 (i.e., y=0x26) hexadecimal (i.e., y=0b00100110 binary). Alternatively, other edges of the checkerboard blocks may be detected and output the corresponding coordinates.

It should be noted that in some cases the lines may not line up precisely with the sensor pixel boundaries. In this case, the pixels on the fine line and the edges of the squares may record a value somewhere between white and black. In one exemplary embodiment, each pixel may be read as an 8-bit gray scale, with black=255 and white=0. If a fine line, 1-pixel wide, overlapped two pixels (e.g., half of the line on one pixel and half the line on an adjacent pixel), each of these two pixels would each register a gray scale value of 128. This may be used to improve the resolution by interpolation.

The embodiment of FIG. 8 includes an 8-bit resolution, using a 32×32 image sensor. In another embodiment, a resolution of nine or more bits may be achieved with even a small pixel array in the image sensor. In an exemplary embodiment, there may be 8 different line locations for each axis within each square, 3 bits of x- or y-axis resolution may be encoded in the location (8 positions*2 colors) as a course grain resolution. These three bits of the line location would be the three MSB of each output coordinate. Using a 64×64 pixel image sensor, an additional 6 bits may be encoded in the position of the image sensor relative to the checkerboard pattern as a fine grain resolution, giving a total of 9 bits resolution for a very modestly sized (4 k pixels) image sensor. In another embodiment, a 21×21 pixel array may be used. Alternatively, other resolutions and image sensor resolutions known by those of ordinary skill in the art may be used in determining the absolute position of the image sensor relative to the field of view of the image sensor and relative to the checkerboard pattern of pattern 800.

By detecting the position of horizontal and vertical lines superimposed on a checkerboard pattern, relative to the checkerboard pattern, and relative to the field of view of the image sensor, the absolute position of the image sensor over the pattern may be determined.

FIG. 9 illustrates a close-up view of one embodiment of an image seen in one of the field of views of the image sensor of FIG. 8. FIG. 9 represents the field of view 805(2) of the pattern 800 of FIG. 8. Field of view 805(2) of FIG. 9 includes light-colored blocks 803(23)(26)(27) and (31), dark-colored blocks 804(22)(23)(27)(30) an (31), light- and dark-colored portions of vertical line 802(5), and light- and dark-colored portions of horizontal line 801(7). As previously described, upon detecting this portion of the pattern 800, including the intersection of the light-colored portions of vertical line 802(5) and horizontal line 801(7) within the dark-colored block 802(27), the image sensor outputs an x-coordinate of 0x93 (i.e., x=0x93) hexadecimal (i.e., x=0b10010011 binary) and a y-coordinate of 0x33 (i.e., y=0x33) hexadecimal (i.e., y=0b00110011 binary), as described in more detail with respect to FIG. 9.

Field of view 805(2) of FIG. 9 also includes coarse rows 901(0)-901(2), coarse columns 902(3)-902(5), fine rows 903(0)-903(31), and fine columns 904(0)-904(31). It should be noted that the fine rows 903 and fine columns 904 have been outlined with dotted lines to represent the pixel boundaries of the sensor image. The field of view 805(2) includes a fine grain resolution of 32×32 pixels, represented by 5-bits in the x-direction and 5-bits in the y-direction. The fine grain resolution constitutes the five least significant bits (LSBs) of the corresponding x- and y-coordinate outputs. The fine grain resolution is made up of the pixel boundaries of the fine rows 903 and fine columns 904 within the field of view 805(2). Similarly, pattern 800 has eight line locations, and a corresponding coarse grain resolution of 8x8, represented by 3-bits in the x-direction and 3-bits in the y-direction. The coarse grain resolution is made up of the light- and dark-colored blocks 803 and 804 with superimposed lines 801 and 802. The coarse grain resolution constitutes the three most significant bits (MSBs) of the corresponding x- and y-coordinate outputs.

In this embodiment, the output signals for x- and y-directions includes 8 bits, including three MSBs, indicating which coarse row 901 (e.g., y-direction) and coarse column 902 (e.g., x-direction) is within the field of view 805(2), and five LSBs, indicating which fine row 903 (e.g., y-direction) contains the horizontal line 802, and which fine column 904 (e.g., x-direction) contains the vertical line 802 (e.g., x-direction). For example, as illustrated in FIG. 9, vertical line 802(5) is located in the coarse column 902(4), and thus, the output signal for the x-direction includes in the three MSBs the number four (e.g., x=0b100). Vertical line 802(5) is also located in the fine column 904(19), and thus, the output signal for the x-direction includes in the five LSBs the decimal number nineteen (e.g., x=0b10011 binary). Similarly, horizontal line 801(7) is located in the coarse row 901(1), and thus, the output signal for the y-direction includes in the three MSBs the decimal number one (e.g., y=0b001 binary). Horizontal line 801(7) is also located in the fine row 903(19), and thus, the output signal for the y-direction includes in the five LSB the decimal number nineteen (e.g., y=0b10011 binary). Combining the MSBs and the LSBs of the line location of vertical line 802(5) and the MSBs and the LSBS of the line location of horizontal line 801(7) within the field of view 805(2) of pattern 800, the image sensor outputs an x-coordinate of 0x93 (i.e., x=0x93) hexadecimal (i.e., x=0b10010011 binary) and a y-coordinate of 0x33 (i.e., y=0x33) hexadecimal (i.e., y=0b00110011 binary).

As previously mentioned, by detecting the position of horizontal and vertical lines superimposed on a checkerboard pattern, relative to the checkerboard pattern, and relative to the field of view of the image sensor, the absolute position of the image sensor over the pattern may be determined.

In another embodiment, the pattern printed on surface 101 may be a pattern having differing reflective areas, light- and dark-colored areas for detecting a difference in light reflection for detecting a center point for recalibrating the absolute position of the surface member.

In one exemplary embodiment, the pattern is a checkerboard pattern having alternating light- and dark-colored blocks, and vertical and horizontal lines superimposed on a checkerboard pattern. The portions of the vertical lines are light-colored when superimposed on the dark-colored blocks and dark-colored when superimposed on the light-colored blocks of the checkerboard pattern. The portions of the horizontal lines are light-colored when superimposed on the dark-colored blocks and dark-colored when superimposed on the light-colored blocks of the checkerboard pattern. Alternatively, other patterns having unique light- and dark-colored features may be used to detect the absolute position of the surface member.

In one embodiment, a pattern printed on the surface may be used to determine x- and y-displacements. Alternatively, the printed pattern may be used to determine rotational movements in the z-axis. The z-axis displacement rotations may be determined by detecting an angle of the edges between the light- and dark-colored blocks, as previously described with respect to detecting an angle of the cross-shaped center marker or reference point.

In another embodiment, the optical motion sensor 105 (e.g., CMOS image sensor) may image surface 101 (e.g., curved or flat), having a light-colored background, with a dark-colored cross on the surface 101. The cross may be positioned on the surface 101 such that it remains within the extremities of the filed of view of the image sensor as the user interface mechanism (e.g., joystick handle) moves within the limits of its motion. A processing element, for example, signal processing block 107, may calculate the absolute position of the cross by processing the image, and determining the pixels at the center of the cross. In one embodiment, the absolute position may be determined in the x- and y-directions using the pixels located at the center of the cross of the processed image. Alternatively, rotations of the user interface mechanism may be determined by processing the image, and determining the rotation of the cross with respect to a fixed rest position.

In one embodiment, a method for determining an absolute position of a surface member and reducing drift in the absolute position of the surface member includes one or more of the following operations: providing a white surface on the surface member, providing a dark dot for a center point, accumulating incremental displacements of the surface member, detecting a reflectivity of the center point. In one embodiment, detecting the reflectivity of the center point includes looking at the duty cycle of the light source used to illuminate the surface of the surface member. Alternatively, detecting the reflectivity of the center point includes reading intensity/duty cycle information from a register in the optical motion sensor. The method may further include accumulating counts of incremental displacements of the surface member in the x-, and y-directions and resetting the accumulated counts upon detecting the reflectivity of the center point. The incremental displacements may represent the net movement of the surface member. As previously mentioned, mouse applications have a loose count of the net movement, meaning error exists in the net movement. This error is conventionally corrected via the user as a negative feedback operation. However, by periodically detecting the reference position by detecting the reflectivity of the center point, the counts in the x- and y-directions may be reset, increasing the accuracy of tracking, determining the absolute position of the surface as it is moved over the fixed optical motion sensor, and reducing drift in the absolute position of the surface member.

FIG. 10 illustrates a flow chart diagram of one embodiment of a method for determining displacement of a surface member coupled to a user interface using a fixed optical motion sensor. Method 1000 may include moving a surface member (e.g., 401 or 601) over a fixed optical motion sensor (e.g., 105 or 205), operation 1001, determining displacement of the surface member (e.g., 401 or 601) using the fixed optical motion sensor (e.g., 105 or 205), operation 1002. In another embodiment, method 1000 may further include determining an absolute position of the surface member (e.g., 401 or 601) using the displacement of the surface member (e.g., 401 or 601), as determined in operation 1002, illustrated in operation 1003. In another embodiment, method 1000 may further include reducing drift in the absolute position of the surface member (e.g., 401 or 601), operation 1004. Reducing the drift in the absolute position may increase the accuracy of the optical motion sensor (e.g., 105 or 205).

In one embodiment, operation 1004 may include transmitting light onto the surface member (e.g., 401 or 601) using a light source, such as light source 102 or LED 402, operation 1005, detecting a difference in light reflection between a first reflective area (e.g., dark-colored dot) and a second reflective area (e.g., light-colored surface), the first reflective area being less reflective than the second reflective area, operation 1006, and recalibrating a center point (e.g., x-, y-, z-coordinate of (0, 0, 0)) upon detecting the difference in light reflection between the first and second reflective areas, operation 1007. In one embodiment, the first reflective area is a dark-colored dot, and the second reflective area is light-colored. Alternatively, the first reflective area is a dark-colored cross or dark lines superimposed on light-colored checkerboard blocks. It should be noted that in the embodiment of light- and dark-colored lines superimposed on dark- and light-colored checkerboard blocks, respectively, the lightness and darkness of a particular area of the field of view may be detected from the amount of light detected by each individual pixel of the sensor.

In one embodiment, detecting the difference in light reflection between the first reflective area and the second reflective area may include determining a duty cycle of the light source 102. The duty cycle of the light source 102 may include a first period when detecting the first reflective area (e.g., dark-colored dot) and a second period when detecting the second reflective period (e.g., light-colored surface), where the first period is more than the second period. Alternatively, detecting the difference in light reflection between the first reflective area (e.g., portion of a dark-colored line) and the second reflective area (e.g., light-colored checkerboard block) may include detecting a position of a vertical line 802 superimposed on a checkerboard pattern (e.g., pattern 800) relative to the checkerboard pattern and relative to a field of view 805 of the fixed optical motion sensor (e.g., 105 or 205), detecting a position of a horizontal line 801 superimposed on a checkerboard pattern (e.g., pattern 800) relative to the checkerboard pattern and relative to a field of view 805 of the fixed optical motion sensor (e.g., 105 or 205), and determining the absolute position of the surface member (e.g., 401 or 601) using the position of the vertical line 802 and horizontal line 801 relative to the checkerboard pattern and relative to the field of view of the fixed optical motion sensor. In another embodiment, the method may further include detecting a angle of a horizontal line 801 or a vertical line 802 superimposed on a checkerboard pattern (e.g., pattern 800) relative to the checkerboard pattern and relative to a field of view 805 of the fixed optical motion sensor (e.g., 105 or 205), and determining the displacements of the surface member (e.g., 401 or 601) in the z-axis or twist-axis using the angle of the vertical or horizontal lines 802 and 801 relative to the checkerboard pattern and relative to the field of view of the fixed optical motion sensor.

FIG. 11 illustrates a flow chart diagram of one embodiment of a method for determining an absolute position of a surface member coupled to a user interface in an x-/y-plane. In one embodiment, method 1100 may include operations 1001-1003 as described with respect to FIG. 10. Operation 1003 may further include accumulating the x-direction incremental displacements of the surface member (e.g., 401 or 601), operation 1101, and storing an x-direction value of the accumulated x-direction incremental displacements, operation 1102. Storing the accumulated incremental displacements may be done in a register within the optical motion sensor (e.g., 105 or 205) or alternatively, may be stored in a register or memory of the signal processing block 107 or DSP 207. The method may further include accumulating the y-direction incremental displacements, operation 1103, and storing a y-direction value of the accumulated y-direction incremental displacements, operation 1104. Similarly, the accumulated incremental displacements may be stored in a register within the optical motion sensor (e.g., 105 or 205) or alternatively, may be stored in a register or memory of the signal processing block 107 or DSP 207. In another embodiment, the method may further include recalibrating a center point upon detecting the difference in light reflection between the first (e.g, dark-colored dot) and second reflective areas by resetting the stored x- and y-direction values to zero, operation 1105.

In another embodiment, method 1100 may include accumulating z-direction incremental displacements, operation 1106, and storing a z-direction value of the accumulated z-direction incremental displacements, operation 1107. The accumulated z-direction incremental displacements may be stored in a register within the optical motion sensor (e.g., 105 or 205) or alternatively, may be stored in a register or memory of the signal processing block 107 or DSP 207. The method may further include detecting an angle of an edge of the first reflective area (e.g., edge of dark-colored cross), operation 1108, and recalibrating the center point by resetting the stored z-direction value to zero when the detected angle of the edge matches an non-rotated angle of the edge, operation 1109. In another embodiment, detecting the angle may include detecting an angle of a vertical line 802 or horizontal line 801 superimposed upon a light- and dark-colored checkerboard pattern (e.g., 800).

Figure 12:
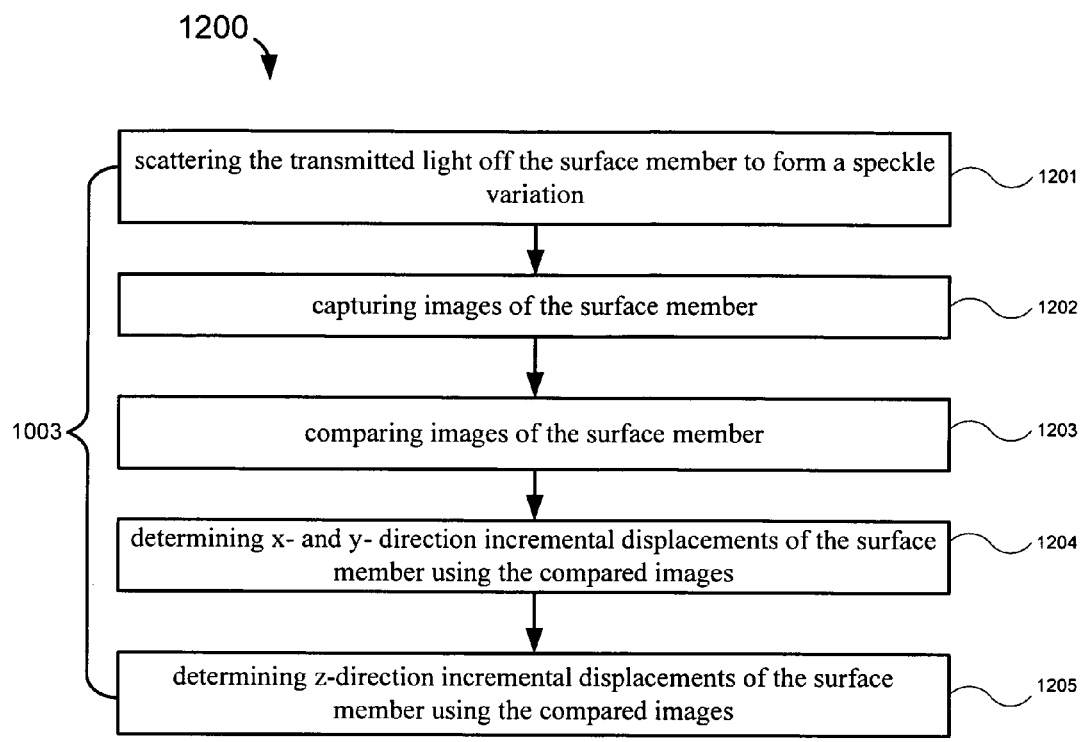
FIG. 12 illustrates a flow chart diagram of one embodiment of a method for determining an absolute position of a surface member coupled to a user interface in an x-/y-/z-plane.

FIG. 12 illustrates a flow chart diagram of one embodiment of a method for determining an absolute position of a surface member coupled to a user interface in an x-/y-/z-plane. In one embodiment, method 1200 may include operations 1001-1003 as described with respect to FIG. 10. In one embodiment, determining displacement of the surface member of operation 1003 may further include scattering the transmitted light from the light source 102 off the surface member (e.g., 401 or 601) to form a speckle variation (e.g., 304), operation 1201, capturing images of the surface member, operation 1202, comparing images of the surface member, operation 1203; and determining x- and y-direction incremental displacements of the surface member using the compared images, operation 1204. Alternatively, method 1200 may further include scattering the transmitted light from the light source 102 off the surface member 401 or 601 to form a speckle variation 304, operation 1201, capturing images of the surface member, operation 1202, comparing images of the surface member, operation 1203, determining x- and y-direction incremental displacements of the surface member using the compared images, operation 1204, and determining z-direction incremental displacements of the surface member using the compared images, operation 1205.

Figure 13:
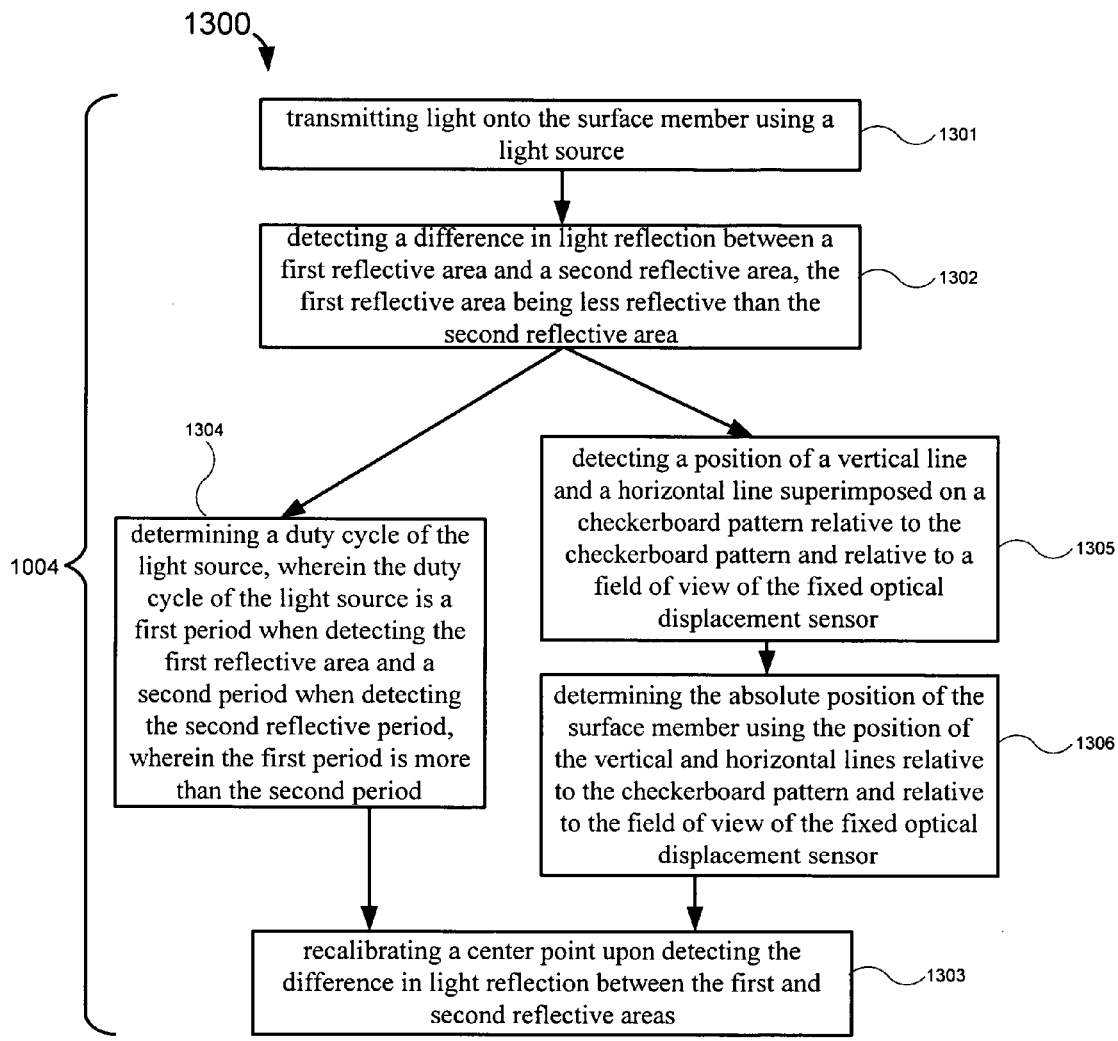
FIG. 13 illustrates a flow chart diagram of another embodiment of a method reducing drift in the absolute position of the surface member.

FIG. 13 illustrates a flow chart diagram of another embodiment of a method reducing drift in the absolute position of the surface member. Method 1300 may include operations 1001-1003, as described with respect to FIG. 10. Method 1300, which represents another embodiment of reducing drift in the absolute position of the surface member of operation 1004 may further include transmitting light onto the surface member 401 or 601 using a light source 102 (e.g., LED 402), operation 1301; detecting a difference in light reflection between a first reflective area (e.g., dark-colored dot) and a second reflective area (e.g., light-colored surface), the first reflective area being less reflective than the second reflective area, operation 1302; and recalibrating a center point by resetting the accumulated counts of the x- and y-incremental displacements upon detecting the difference in light reflection between the first and second reflective areas, operation 1303.

In one embodiment, detecting the difference in light reflection between the first reflective area and the second reflective area of operation 1302 may include determining a duty cycle of the light source 102, operation 1304. The duty cycle of the light source may include a first period when detecting the first reflective area (e.g., dark-colored dot or cross) and a second period when detecting the second reflective area (e.g., light-colored surface), where the first period is more than the second period. Alternatively, detecting the difference in light reflection between the first reflective area and the second reflective area of operation 1302 may include detecting a position of a vertical line 802 and of a horizontal line 801 superimposed on a checkerboard pattern 800 relative to the checkerboard pattern 800 and relative to a field of view 805 of the fixed optical motion sensor 105 or 205, operation 1305; and determining the absolute position of the surface member (e.g., 401 or 601) using the position of the vertical and horizontal line relative to the checkerboard pattern 800 and relative to the field of view 805 of the fixed optical motion sensor, operation 1306. It should be noted that the lightness and darkness of a particular area of the field of view may be detected from the amount of light detected by each individual pixel of the sensor.

In one embodiment, a method may further include sensing movement of the surface member across a fixed, optical motion sensor, using an optical motion sensor having a number of comb-detector motion sensors, each including a number of detectors arranged along an axis parallel to a plane of the surface, at least two of the number of comb-detector motion sensors having detectors arranged along axes not parallel to one another. The method may further include the operations of: (i) generating at least two motion dependent signals from the number of comb-detector motion sensors, each of the motion dependent signals being a weighted sum of output from a sum from a different combination of the number of detectors; (ii) measuring changes in phase angle of the motion-dependent signals; and (iii) determining the displacement of the surface member relative to the fixed optical motion sensor using the measured changes in phase angle of the motion-dependent signals.

In one embodiment, the operation of determining the displacement of the surface member relative to the fixed optical motion sensor includes the operation of determining the displacement of the surface member using the equation (4) shown above.

In one embodiment, the operation of generating at least two motion dependent signals includes the operation of generating at least two motion dependent signals using different weightings for each different combination of photosensitive elements.

In another embodiment, each of the combinations of photosensitive elements includes photosensitive elements to from a single LCA, and each of the photosensitive elements is separated from one another along the axis of the LCA by a repeating predetermined period. In one version of this embodiment, the operation of generating at least two motion dependent signals includes the operation of generating at least two motion dependent signals using different weightings for different repeating predetermined periods. The operation of generating at least two motion dependent signals may include the further operation of generating at least two motion dependent signals using an additional set of weighting for each photosensitive element, the additional set of weighting selected to de-emphasize photosensitive elements at ends of the LCA. The sets of weighting may be selected to reduce unwanted harmonics in the motion-dependent signals.

The embodiments described herein, unlike traditional potentiometer based joysticks, have effectively unlimited life because they are non-contacting sensors. The optical motion sensor has higher precision, accuracy, and linearity, and has lower noise than traditional potentiometer based joysticks. The accuracy and precision may be increased by the reduction of drift in detecting the center point and recalibrating the incremental, accumulated counts. The accuracy and precision may also be increased by detecting center point independent of detecting the motion of the surface member. By eliminating non-linear contact sensors, linearity in the present embodiments may be increased; thus, the output signals of the optical-based sensor provide the same output values for equal distance movements. Noise in the above-described embodiments may be reduced because the sensor is optically-based, eliminating electrical noise introduced by potentiometers.

The present embodiments have comparable or lower costs than the conventional higher quality potentiometer based solutions described above, which leverages the cost reduction curve from a very high volume application—optical mice, which averages 100 million units per year and growing.

The embodiments described herein, unlike conventional optical joystick solutions, have a simpler mechanical configuration. For example, the existing optical solution may require translation of handle rotational motion into planar translational motion. The present embodiments have less demanding tolerance requirements than conventional optical joystick solutions because the optical motion sensor can tolerate some variation in distance between the optical motion sensor and surface member, whereas existing optical solutions require precision assembly to ensure alignment of LED and photodiode array. Similarly, by leveraging from the existing mouse technology, a very high volume application, the cost of manufacturing is lower than conventional optical joysticks.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the invention.

Similarly, it should be appreciated that in the foregoing description of exemplary embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed embodiments requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed:

1. An apparatus, comprising:
    an optical motion sensor;
    a user interface member; and
    a surface member coupled to the user interface member, the surface member operatively coupled to move over the optical motion sensor, the optical motion sensor to detect a fixed reference point on the surface member, wherein the surface member includes a first reflective area having a first reflectivity and a second reflective area having a second reflectivity, and wherein the first and second reflective areas comprise:
    horizontal lines superimposed on a checkerboard pattern having alternating blocks of the first reflective area and the second reflective area, wherein the horizontal lines have the second reflectivity when superimposed upon blocks of the first reflective area and have the first reflectivity when superimposed upon blocks of the second reflective area; and
    vertical lines superimposed on the checkerboard pattern, wherein the vertical lines have the second reflectivity when superimposed upon blocks of the first reflective area and have the first reflectivity when superimposed upon blocks of the second reflective area.

2. The apparatus of claim 1, wherein the optical motion sensor is an optical mouse sensor.

3. The apparatus of claim 1, wherein the first reflective area is less reflective than the second reflective area.

4. The apparatus of claim 3, wherein the known position is a rest position.

5. The apparatus of claim 1, wherein the user interface member is a handle.

6. The apparatus of claim 5, further comprising a motion translation assembly coupled to the user interface member, the motion translation assembly to translate angular motion of the handle into linear planar motion.

7. The apparatus of claim 6, wherein the motion translation assembly comprises:
   a shaft having a pivot point to allow tilt of the handle in any combination of x- and y-directions;
   a plate having a hole, the shaft is placed through the hole; and
   a set of guide rails to allow the plate to move only in a plane in both x- and y-directions.

8. The apparatus of claim 1, wherein the user interface member is a trackball.

9. The apparatus of claim 1, wherein the surface member comprises a flat surface member.

10. The apparatus of claim 1, wherein the surface member comprises a curved surface member.

11. The apparatus of claim 10, wherein the curved surface member is a substantially constant distance from the optical motion sensor.

12. The apparatus of claim 1, wherein the optical motion sensor comprises:
   an array of photodiodes;
   an amplifier coupled to the array of photodiodes;
   an analog to digital converter (ADC) coupled to the amplifier; and
   a processing device coupled to the ADC.

13. The apparatus of claim 12, further comprising:
   a light source to transmit light onto the surface member;
   illumination optics to focus the transmitted light onto a focused area of the surface member, the surface member scatters the transmitted light forming a speckle variation; and
   imaging optics to focus the scattered light forming the speckle variation onto the array of photodiodes.

14. A method, comprising:
   moving a surface member over a fixed optical motion sensor;
   determining displacement of the surface member using the fixed optical motion sensor;
   detecting a fixed reference point on the surface member;
   determining an absolute position of the surface member using the displacement of the surface member; and
   reducing drift in the absolute position of the surface member, wherein reducing drift in the absolute position of the surface member comprises:
   transmitting light onto the surface member using a light source;
   detecting a difference in light reflection between a first reflective area and a second reflective area, the first reflective area being less reflective than the second reflective area; and
   recalibrating the fixed reference point upon detecting the difference in light reflection between the first and second reflective areas, and wherein determining the absolute position of the surface member further comprises:
   accumulating x-direction incremental displacements;
   storing an x-direction value of the accumulated x-direction incremental displacements;
   accumulating y-direction incremental displacements;
   storing a y-direction value of the accumulated y-direction incremental displacements;
   accumulating z-direction incremental displacements;
   storing a z-direction value of the accumulated z-direction incremental displacements; and
   detecting an angle of an edge of the first reflective area; and wherein reducing drift in the absolute position of the surface member comprises resetting the stored z-direction value to zero when the detected angle of the edge matches a non-rotated angle of the edge, and wherein recalibrating the fixed reference point comprises resetting the stored x-direction and y-direction values to zero.

15. The method of claim 14, wherein the known position is a rest position.

16. The method of claim 14, further comprising reducing drift in the absolute position of the surface member, wherein reducing drift in the absolute position of the surface member comprises determining a duty cycle of a light source to illuminate the surface member, wherein the duty cycle of the light source comprises:
   a first period when detecting a first reflective area; and
   a second period when detecting a second reflective period, wherein the first period is more than the second period.

17. The method of claim 14, further comprising reducing drift in the absolute position of the surface member, wherein reducing drift in the absolute position of the surface member comprises:
   detecting a position of a vertical line and a horizontal line superimposed on a checkerboard pattern relative to the checkerboard pattern and relative to a field of view of the fixed optical motion sensor; and
   calculating the absolute position of the surface member using the position of the vertical and horizontal lines relative to the checkerboard pattern and relative to the field of view of the fixed optical motion sensor.

18. The method of claim 14, wherein determining displacement of the surface member comprises:
   scattering the transmitted light off the surface member to form a speckle variation;
   capturing images of the surface member;
   comparing images of the surface member; and
   determining x- and y-direction incremental displacements of the surface member using the compared images.

* * * * *